United States Patent
Rennison et al.

(10) Patent No.: US 10,878,381 B2
(45) Date of Patent: Dec. 29, 2020

(54) IDENTIFICATION OF JOB SKILL SETS AND TARGETED ADVERTISING BASED ON MISSING SKILL SETS

(71) Applicant: Monster Worldwide, Inc., New York, NY (US)

(72) Inventors: Earl F. Rennison, Mountain View, CA (US); Praveen Arasada, Cupertino, CA (US); Jun Luo, Santa Clara, CA (US)

(73) Assignee: Monster Worldwide, Inc., New York, NY (US)

(*) Notice: Subject to any disclaimer, the term of this patent is extended or adjusted under 35 U.S.C. 154(b) by 1746 days.

(21) Appl. No.: 13/872,925

(22) Filed: Apr. 29, 2013

(65) Prior Publication Data

US 2014/0324721 A1    Oct. 30, 2014

(51) Int. Cl.
  *G06Q 10/10* (2012.01)
  *G06Q 10/06* (2012.01)
  *G06Q 50/20* (2012.01)

(52) U.S. Cl.
  CPC ..... *G06Q 10/1053* (2013.01); *G06Q 10/0631* (2013.01); *G06Q 10/105* (2013.01); *G06Q 10/1057* (2013.01); *G06Q 50/2057* (2013.01)

(58) Field of Classification Search
  CPC .............. G06Q 10/105; G06Q 10/1057
  USPC .................................. 705/1.1, 320
  See application file for complete search history.

(56) References Cited

U.S. PATENT DOCUMENTS

| | | |
|---|---|---|
| 7,599,930 B1 | 10/2009 | Burns et al. |
| 7,720,791 B2 | 5/2010 | Hyder et al. |
| 7,827,125 B1 * | 11/2010 | Rennison ............ G06F 17/3066 706/14 |
| 7,836,060 B1 * | 11/2010 | Rennison .......... G06F 17/30675 707/749 |
| 8,024,329 B1 | 9/2011 | Rennison |
| 2004/0148180 A1 | 7/2004 | Pajwani |
| 2006/0111932 A1 | 5/2006 | Brown et al. |
| 2007/0022188 A1 | 1/2007 | Kohs |
| 2008/0086366 A1 | 4/2008 | Concordia et al. |

(Continued)

OTHER PUBLICATIONS

Archive of "15110 Introduction to Programming," Carnegie Mellon University, www.cmu.edu, 2 pages, [Online] [Archived by http://archive.org on Jun. 14, 2010; Retrieved on Jan. 23, 2013], Retrieved from the Internet<URL:http://web.archive.org/web/20100614035254/https://enr-apps.as.cmu.edu/open/SOC/SOCServlet?CourseNo=15110&SEMESTER=F10&Formname=Course_Detail>.

(Continued)

*Primary Examiner* — Sangeeta Bahl
(74) *Attorney, Agent, or Firm* — Fenwick & West LLP

(57) ABSTRACT

Methods and systems are disclosed for determining gaps in a user's resume regarding skills or titles for a job, and recommending educational courses to the user based on those gaps. The user's resume is received and analyzed for the user's current set of skills. Various searching methods are used to identify a set of job requisitions based on a user's input query for a job. The user's skills are compared with a set of required skills associated with the set of job requisitions. Educational courses are identified for the skills that are required for the set of job requisitions but are not present in the user's set of skills. The educational courses presented to the user via the search engine. The user's resume can also be ranked relative to other resumes for the skills or titles required for a job.

28 Claims, 15 Drawing Sheets

(56) References Cited

U.S. PATENT DOCUMENTS

| | | | |
|---|---|---|---|
| 2009/0319515 A1 | 12/2009 | Minton et al. | |
| 2009/0327013 A1 | 12/2009 | McGovern et al. | |
| 2010/0233663 A1* | 9/2010 | Pennington | G09B 19/00 |
| | | | 434/219 |
| 2012/0158696 A1 | 6/2012 | Arasu | |
| 2012/0232944 A1* | 9/2012 | Zhu | G06Q 10/063112 |
| | | | 705/7.14 |
| 2012/0264098 A1* | 10/2012 | Megargel | G09B 7/02 |
| | | | 434/322 |
| 2014/0122355 A1 | 5/2014 | Hardtke et al. | |
| 2014/0156688 A1 | 6/2014 | Wong | |
| 2014/0278821 A1 | 9/2014 | McConnell | |

OTHER PUBLICATIONS

College of Southern Maryland, "Web Developer," Feb. 14, 2007, 2 pages, [retrieved on May 13, 2014]. Retrieved from the Internet: https://web.archive.org/web/20070214051100/http://www.csmd.edu/academics/program/CE.WEB.DEV/2006-2008.html.

http://web.archive.org/web/20070214051100/http://www.csmd.edu/academics/program/CE.WEB.DEV/2006-2008.html.

Cappelli, P., "Why Good People Can't Get Jobs: The Skills Gap and What Companies Can Do About It," Wharton Digital Press, May 29, 2012, pp. 1-107.

Lee, I., "An Architecture for a Next-Generation Holistic E-Recruiting System," Communication of the ACM, vol. 50, No. 7, Jul. 2007, pp. 81-85.

United States Office Action, U.S. Appl. No. 15/615,718, dated Jun. 24, 2020, 12 pages.

* cited by examiner

IDENTIFICATION OF JOB SKILL SETS AND TARGETED ADVERTISING BASED ON MISSING SKILL SETS

BACKGROUND

This invention relates generally to identifying educational courses for a user of a job search application.

Users of job search engines and online job search services request job postings that match their queries. The job postings typically require that the job candidate have certain prerequisites for educational background or training. Existing methods and systems typically provide job search results that include job postings with prerequisites for a job. However, a user does not have an easy way to identify the gaps in his resume that he needs to fill to meet the typical prerequisites for a given type of job search. The user may also not be aware of educational courses or training that he or she needs to meet the requirements for a type of job. Current job search applications do not provide the user with mechanism for more detailed analysis of his resume, including identifying resume gaps and determining how a resume ranks relative to other resumes in meeting the requirements for a type of job, nor do they provide recommendations for educational courses, certifications, or training that match skills that the user does not currently have and that the user needs to be qualified for a type of job.

SUMMARY

Various types of multi-way nested searching are used to identify gaps in a user's resume in terms of skills and/or titles that the user might need to meet the requirements of a certain job requisition or a group of job requisitions matching the user's input query. For example, if one or more job requisitions require Java programming skills and the user's resume does not include this skill, the multi-way nested searching can identify this as one of the gap skills for the user's resume. Similarly, if job requisitions tend to require that the job candidate have held a title of senior software engineer and the user only has the title software engineer or has no software engineer title at all, the multi-way nested searching can identify this as a gap title for the user.

Multi-way nested searching is also used in some embodiments to search for and present to the user educational courses that might help the user acquire the skills and/or titles missing. For example, for the user missing the Java programming skills, the search might suggest one or more courses related to learning Java. In addition, for the user missing the senior software engineer title, the search might suggest one or more courses related to developing the skills that the user needs to achieve a title of senior software engineer in his current job.

In addition, multi-way nested searching is used in some embodiments to rank the user's resume relative to other resumes for the skills and/or titles required for a job or type of job. The user can thus determine how his resume fares relative to other resumes of users with whom he may be competing for the same jobs.

Figure 1:
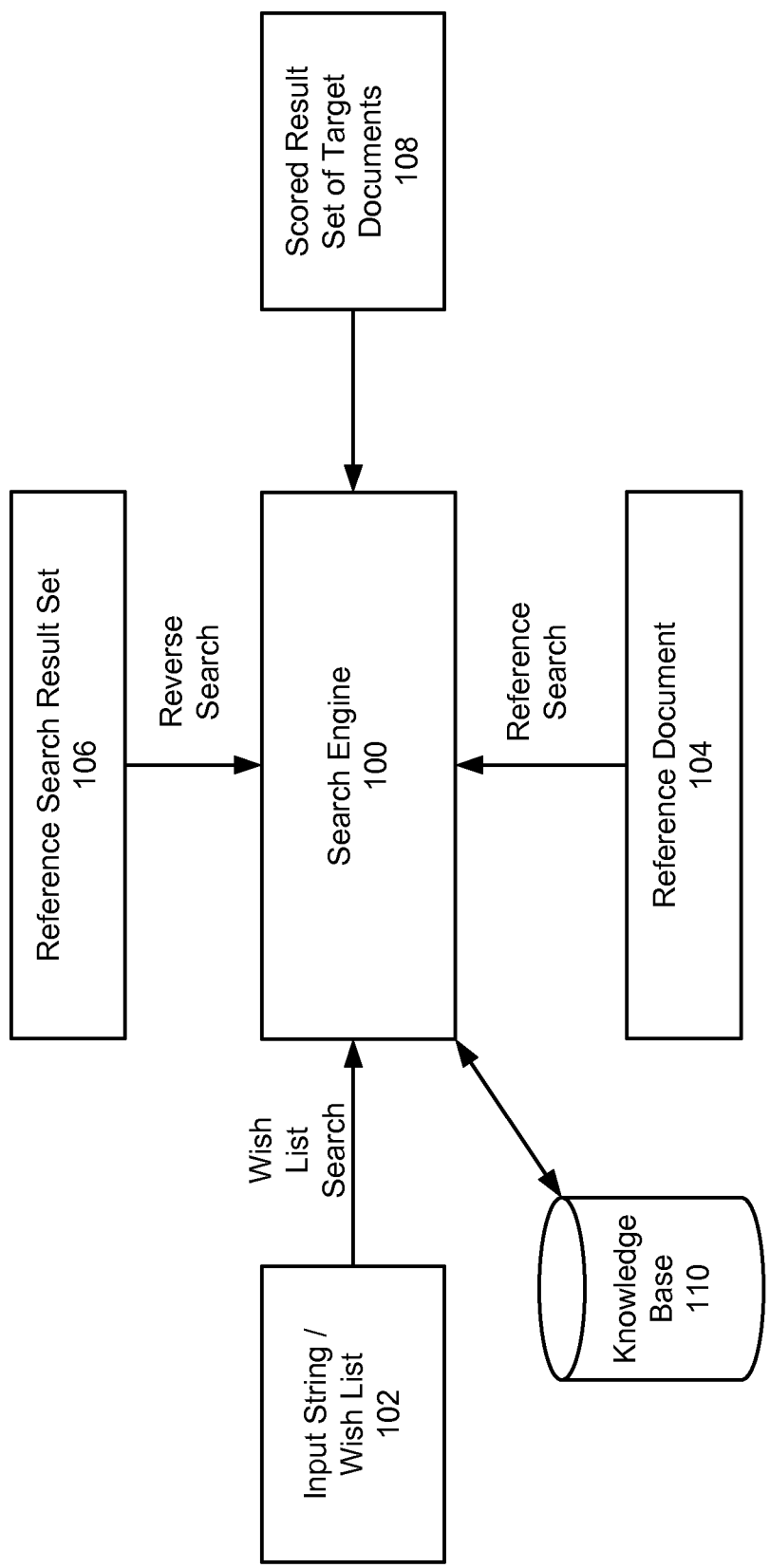
FIG. 1 is a high-level block diagram illustrating the search engine, according to one embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. Overview

Described herein are various embodiments of systems and methods for identifying gaps in a user's resume, targeting educational courses to the user, and ranking the user's resume.

Definitions

As used herein, the term "concept" includes any type of information or representation of an idea, topic, category, classification, group, term, unit of meaning and so forth, expressed in any symbolic, graphical, textual, or other forms that are capable of being stored in a computer memory. For example, concepts typically included in a rèsumè include university names, companies, terms identifying time (e.g., years), experiences, persons, places, locations, names, contact information, hobbies, publications, miscellaneous information, grade point averages, honors, associations, clubs, teams, any type of entity, etc, or a collection of one or more of these. A concept can also be represented by search terms that might be used in a database search, web search, literature search, a search through statutes or case law, a patent search, and the like. In one example, concepts include skills and job titles, which are tagged to job requisitions or educational course and used as search criteria for matching job requisitions or educational courses to input queries, as described herein. Thus, all uses of the term "concepts" are to be understood herein to refer to some form of information stored in a computer system (e.g., a memory circuit, a hard drive, or the like) and not to a purely mental impression in the human mind or otherwise abstract, non-physical entity.

The term "document" (e.g., as in "target document" or "reference document" or "resume") can include any type of document, including resumes, job requisitions or descriptions, books, articles, patents, business plans, corporate documents, webpages, product information documents, e-mails, and any other type of item for which a textual search of its contents might be desired. Documents are also understood to be stored in a computer system.

As referred to herein, "target documents" are the documents of interest or the documents being searched through in order to find relevant search results. An example of a target document is a document with an educational course description or a job requisition document that includes a description about the available job. As referred to herein, "reference documents" are the documents used in the search process that are matched to or otherwise used to obtain a relevant set of target documents in the search. An example of a reference document is a user's resume, which includes information about the user's education, work experience, etc. For example, search terms can be extracted from a reference document, and these terms can be used in conducting a search of a database of target documents.

As referred to herein, "input query" or "query" can include search terms or input strings, such as a keyword search, or can include a document, such as a user's resume. For example, the user might conduct keyword search for job requisitions matching keywords provided by the user, or the user might conduct a search for job requisitions matching his resume (e.g., matching terms in his resume that are used as keywords).

System

A system for contextual personalized information retrieval is used to provide a list of matching job descriptions and/or a list of educational courses to the user. Contextual personalized information retrieval is described in detail in U.S. Provisional Patent Application No. 60/810,486, entitled "Contextual Personalized Information Retrieval" (referred to herein as "Contextual Personalized Information Retrieval Application"), filed Jun. 1, 2006, and U.S. patent application Ser. No. 11/756,951, filed on Jun. 1, 2007, which are hereby incorporated by reference in their entireties for all purposes. The contextual personalized searching methods described in these applications allow for emulation of the way that a human reviews a document, and can effectively deal with basic search problems, including handling synonyms, polysemous words, spelling errors in both the documents as well as the query, abbreviations, word ordering, partial matches, and the like (e.g., through an engine that can employ a statistical-based pattern matching engine to match strings of text to concepts).

Multi-way nested searching is used by the search engine and system to search knowledge bases for relevant job descriptions and educational courses that match the user's input query. Multi-way nested searching is described in U.S. Pat. No. 7,836,060, filed on Apr. 13, 2007, which is incorporated by reference in its entirety. The multi-way nested searching techniques further allow for retrieval of the most relevant search results by applying contextual personalized search methods in various different types of searches that can be combined in the manners described herein to collect the most relevant set of documents.

FIG. 1 shows a high-level block diagram of the system for conducting a multi-way nested search, according to an embodiment of the invention. Canonical semantic knowledge is represented with one or more knowledge bases 110 including concepts that are linked together in a graph of relationships (i.e., as described in detail in the Contextual Personalized Information Retrieval Applications). Document structure can be extracted from a number of documents (e.g., target documents and reference documents), and this structure can be inserted into the knowledge bases 110. Text strings contained in the documents can be matched with concepts in the canonical knowledge bases, and links can be inserted into the knowledge bases 110 to connect the documents' structure with the canonical knowledge bases. In this manner, it is possible to create one or more knowledge bases 110 representing a reference document and one or more knowledge bases 110 representing a target document that can be used in constructing various searches. As will be understood by those of skill in the art, a knowledge base is always a computer-implemented collection of information, and necessarily stored in, and accesses via computer system; thus the term "knowledge base" should not be interpreted to mean simply information a human knows about for a given field or domain.

The multi-way nested search utilizes these one or more knowledge bases 110 to allow the search engine 100 to search through a database of target documents to find the best match for a given situation. In some embodiments, the search engine 100 receives one or more types of input to produce one or more sets of results. As described above, in one node of the multi-way search, a user can input one or more search terms in an input string 102 (e.g., keywords describing the user's wish list of desired features in the target documents) that can be searched for by the engine 100 against the database of target documents to select and score a resulting set 108 of documents. In another node of the multi-way search, a reference document 104 can be input and search terms extracted from the reference document to be searched for by the engine 100 against the database of target documents to select and score a resulting set 108. In yet another node, a reverse search can be conducted in which the reference document is scored against the set of target documents selected/scored in the prior reference document search. In this node, the reference search result set 106 (e.g., set of target documents obtained in the reference document search) is the input. Rather than relying on the search results produced from just one of these searches, the multi-way search techniques allow these various search results 108 and scores to be combined using combining functions to ultimately produce the most relevant set of target documents for the user. These methods are described in more detail below.

Job searching is one example in which multi-way nested searching can be applied. For example, where a job seeker is searching for a job, she can use the multi-way search techniques to conduct wish list search by creating a wish list 102 of features she would like in a job that she can input as search terms (e.g., "software engineer, Bay Area, tech company", etc.). The search engine can match the terms against a database of job descriptions to produce a resulting set 108 of documents of job descriptions that can each be scored against the terms. The job seeker can also perform a reference search by using a resume (e.g., the reference document 104) as the search input. The search can be constructed from the knowledge base structure used to represent the resume, and relevant concepts in the resume, such as user's skills and job titles, can thus be matched against a database of job descriptions (e.g., the target documents) to produce a resulting set 108 of job requisitions (e.g. job descriptions) that can each be scored against the resume. The job seeker can also conduct a reverse search in which each of the job requisitions turned up from the prior search (e.g., reference search result set 106) are used as input. The search can be constructed for each target document from the knowledge base structure used to represent the target document, and relevant concepts in the target documents can thus be matched against the resume/reference document 104. The resume/reference document 104 can be further scored against each of the job requisitions in the reference search result set.

The job seeker can further create a two-way search by combining the search results for two of the above-mentioned searches (e.g., the wish list search, the reference search, or the reverse search). For example, the scores from the reference search and the reverse search can be combined using a combining function to produce a secondary result set of job requisitions that can each be scored, and the system can be configured to allow the user to decide how much weight he/she would like placed on the scores from the resume search versus the scores from the reverse search. To construct a three-way search, the scores of all three searches can be combined. For example, a combining function can be used to combine the scores from the wish list search with the scores for the job requisitions in the secondary result set described above to produce another, more focused resulting set of job descriptions. Again, the user or the system can set how much weight the wish list scores, the reference scores, and the reverse scores are each given. Additional descriptions about multi-way searches are found in U.S. Pat. No. 7,836,060.

While many embodiments described herein refer to job searches or searches through resume documents or job requisitions as an example, the invention can be applied to other areas. In one example, searches can be performed in an educational context, such as performing searches for educational courses for students (high school, college, etc.), technical training courses, educational books, video or audio content, instructors or coaches providing educational training, etc. Thus, the examples described here are to be considered illustrative but not limiting of the scope of the invention or implying necessary or essential features or characteristics. Finally, it should by now be appreciated that all of the operations and methods described herein for creating and manipulating the knowledge bases, as well as the various multi-way searches, are necessarily and always performed by a computer system, based on complex programming and data (as further described below), and therefore cannot be entirely performed mentally in the human mind. While a human user may input certain data and observe certain results, the computer system performs all of the data processing and data analysis steps described herein.

Figure 2:
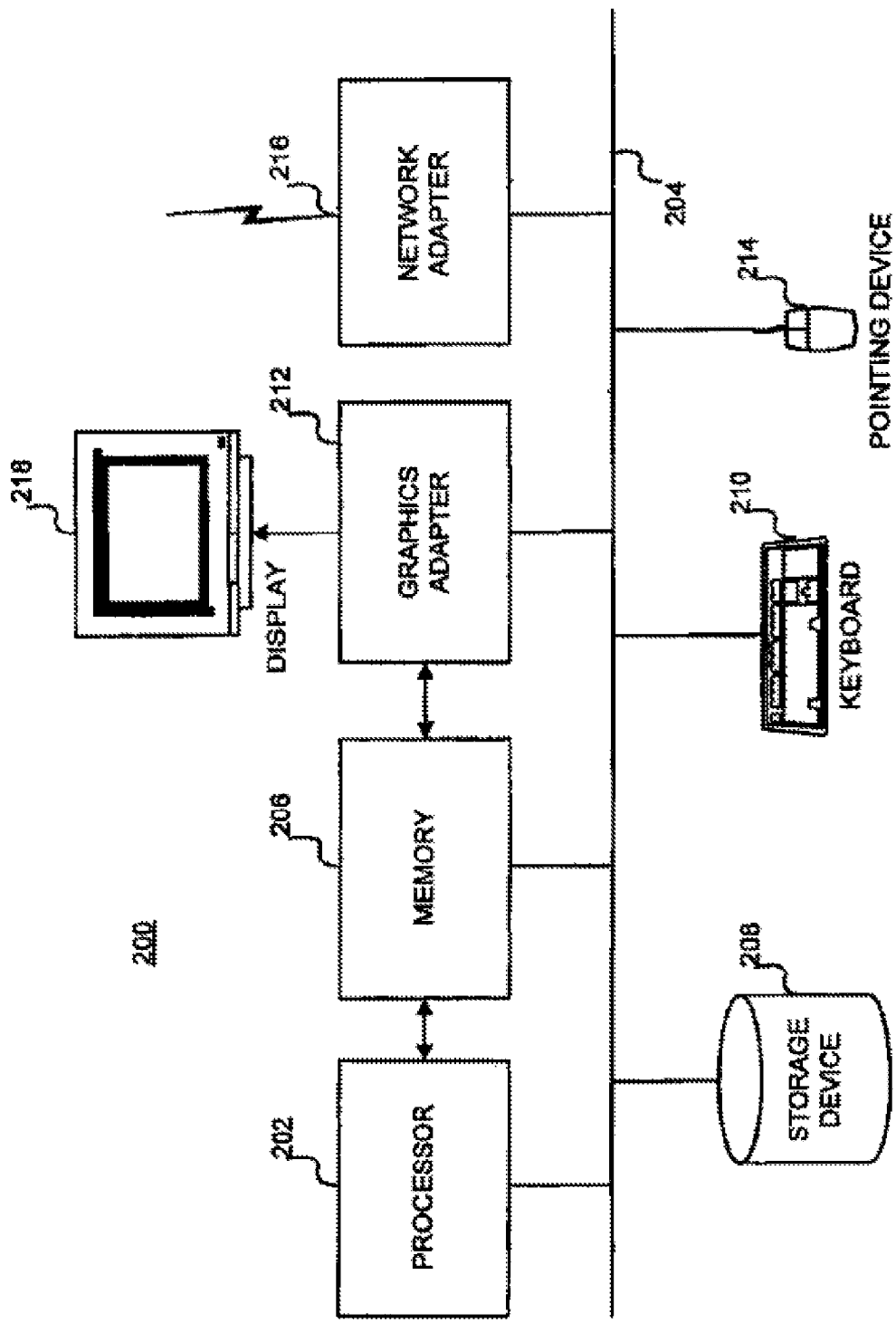
FIG. 2 is a high-level block diagram illustrating a computer system for use with the invention.

FIG. 2 is a high-level block diagram illustrating a functional view of a typical computer system 200 for performing the methods described herein, according to an embodiment of the present invention. One or more of the components of the computer system 200 may be missing or modified when used with system 100. Illustrated is a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212. The processor 202 may be any general-purpose processor such as an INTEL x86, SUN MICROSYSTEMS SPARC, or POWERPC compatible-CPU, or the processor 202 may also be a custom-built processor. The memory 206 may be, for example, firmware, read-only memory (ROM), non-volatile random access memory (NVRAM), and/or RAM, and holds instructions and data used by the processor 202. The storage device 208 is, in one embodiment, a hard disk drive but can also be any other device capable of storing data, such as a writeable compact disk (CD) or DVD, and/or a solid-state memory device. The pointing device 214 may be a mouse, track ball, or other type of pointing device, and is used in combination with the keyboard 210 to input data into the computer system 200. The graphics adapter 212 displays images and other information on the display 218. The network adapter 216 couples the client computer 110 with the Internet 112.

As is known in the art, the computer system 200 is adapted to execute computer program modules for providing functionality described herein. In this description, the term "module" refers to computer program logic for providing the specified functionality. A module can be implemented in hardware, firmware, and/or software. Where the any of the modules described herein are implemented as software, the module can be implemented as a standalone program, but can also be implemented in other ways, for example as part of a larger program, as a plurality of separate programs, or as one or more statically or dynamically linked libraries. It will be understood that the modules described herein represent one embodiment of the present invention. Certain embodiments may include other modules. In addition, the embodiments may lack modules described herein and/or distribute the described functionality among the modules in a different manner. Additionally, the functionalities attributed to more than one module can be incorporated into a single module. In one embodiment of the present invention, the modules are stored on the storage device 208, loaded into the memory 206, and executed by the processor 202. Alternatively, hardware or software modules may be stored elsewhere within the computer system 200.

II. Knowledge Base

Figure 3:
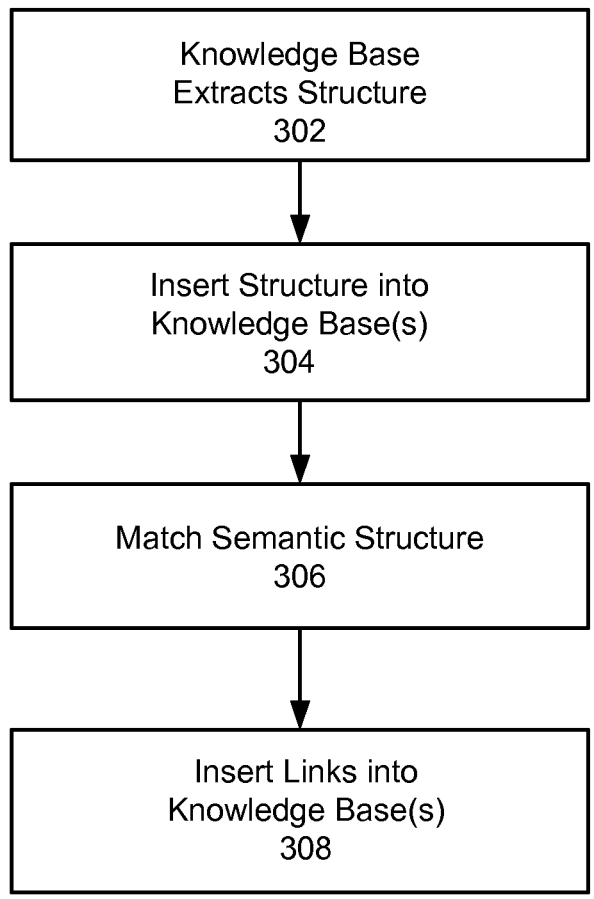
FIG. 3 is a flowchart illustrating creation of the knowledge base, according to one embodiment of the invention.

FIG. 3 illustrates one method for creating the knowledge base used in a multi-way nested search, according to an embodiment of the invention. It should be understood that these steps are illustrative only. Different embodiments of the search engine 100 may perform the illustrated steps in different orders, omit certain steps, and/or perform additional steps not shown in FIG. 3 (the same is true for other FIGS.).

The multi-way nested searching includes both off-line and on-line processes. The off-line processes include information extraction and tagging methods that result in the creation of the one or more knowledge bases to be used in the multi-way searching techniques. The on-line processes include the multi-way searching techniques themselves by which a user can utilize the one or more knowledge bases to conduct a search for information based on a set of search criteria to return a scored set of documents or information objects. Both the off-line and on-line portions of this information retrieval process, and systems and methods of implementing these processes are described in detail in the above-mentioned Contextual Personalized Information Retrieval Applications and Multi-Way Nested Searching Application. Thus, the off-line process of creation of the knowledge base including information extraction and tagging methods is very briefly summarized below with reference to FIG. 3 for background purposes.

With regard to the off-line processes and creation of knowledge bases, a number of "base" knowledge bases are created that are semantic knowledge bases. Examples of base semantic knowledge bases that might be used for job searching include knowledge bases for skills of a job candidate ("SkillKB"), job titles ("TitleKB"), companies ("CompanyKB"), education ("EducationKB"), location ("LocationKB"), etc. A description of and examples of "base" knowledge bases and schemas are included in the Contextual Personalized Information Retrieval Application.

In addition to these "base" semantic knowledge bases, another set of knowledge bases can be defined that represent documents. For example, in job searching, a job candidate knowledge base ("CandidateKB") can be defined to represent rèsumès of job candidates, and a job requisition knowledge base ("RequisitionKB") can be defined to represent job descriptions. The knowledge bases used to represent the documents can contain a structural component and a semantic component. The structural component represents the structure of a document. For example, the CandidateKB can include different categories, where attributes in one category reference another category. A Resume Category might reference a "ResumeEmployment" Category, where the ResumeEmployment is an abstraction of the work experience section of a resume. In addition, to represent the structure of the document, relationships can be defined between the document structure and the "base" semantic knowledge bases, where a category in a knowledge base representing documents can reference a category in a "base" knowledge base. For example, the ResumeEmployment category in the CandidateKB (a knowledge base representing documents) could reference the Company Category in the CompanyKB and a "TitleField" Category in the TitleKB (where the CompanyKB and TitleKB are both "base" semantic knowledge bases), and so forth. Again, these types of knowledge bases, categories, and relationships between them are described in more detail in the Contextual Personalized Information Retrieval Application.

In one embodiment, the knowledge bases include a skill knowledge base ("SkillKB"), a title knowledge base ("TitleKB"), a job requisition base ("RequisitionKB"), a resume or candidate knowledge base ("CandidateKB" or "ResumeKB") and a course knowledge base ("CourseKB"). The SkillKB defines a skill schema that includes a set of attributes associated with job skills used in conducting job searches. The SkillKB stores various job-related skills and the relationships among skills and their tagged job postings, resumes or educational courses. The TitleKB stores concepts for job titles. Each job title can be tagged to a plurality of job requisitions, resumes, or educational courses, and the TitleKB can also store these relationships. The RequisitionKB includes documents with descriptions about available jobs (including requirements for the job) and stores the associations of the tagged skills and tagged job titles to each job posting The CandidateKB includes resumes of various users and stores the associations of the tagged skills and tagged job titles to each resume. The CourseKB includes documents with descriptions about educational courses, including prerequisites (required education, skills or experience, etc.), skills taught in the course, certifications and training received in the course, topics covered in the course, institutional information, course credit information, and the like etc. The concepts (e.g., skills and job titles) that are tagged to each course are also stored in the CourseKB. The CourseKB can include different categories, where attributes in one category reference another category. Each educational course is tagged with relevant concepts, such as skills or job titles in the SkillKB, and TitleKB, to which the course is applicable. The CourseKB stores the associations between the courses and tagged concepts. The methods for tagging courses and job requisitions with skills and job titles is generally described as performed by the Information Structure Extraction and Tagging System in U.S. patent application Ser. No. 11/756,951.

A knowledge base generation engine creates these different kinds of knowledge bases that can be used in conducting multi-way nested searches. A brief summary of the document extraction and tagging process used to create the knowledge bases representing documents is provided here, though more detail is included in the Contextual Personalized Information Retrieval Application regarding both document knowledge bases and "base" semantic knowledge bases. The knowledge base engine extracts 302 semantic structure from an input query, unstructured target document(s), or unstructured reference document(s). For example, structure can be extracted from a collection of rèsumès to create a knowledge base containing categories of information relating to characteristics of potential job applicants. As stated in the above example, a knowledge base includes a "ResumeEmployment" Category, which is an abstraction of the work experience section of a rèsumè. The engine can take as input information or documents in a variety of forms, including, but not limited to, documents in formats such as MS Word, PDF, or plain text; e-mail messages, XML files, or Relational Database records. For unstructured documents, such as MS Word, PDF, and e-mail messages, the document may need to be first converted to a plain/clear text document. The engine can extract 302 semantic structure from the unstructured text content, and thereby converts an unformatted text document into a semantically structured document. The semantically structured document can contain a hierarchy of structure elements that have semantic labels and attributes that describe fields of text data. Some embodiments use the Extensible Markup Language (XML) to represent the semantic structure. However, many other document formats can also be used to represent the semantic structure of the document. In some cases, such as for XML files or content derived from Relational Databases, the semantic structure is already defined so this step 302 can be skipped.

As one example, consider the contact information contained in the Bob Smith ràsumè:

```
Bob K. Smith
1234 My Circle
San Jose, CA 95131
Home: 408-123-4567
Email: bob_k_smith@hotmail.com
```

This document segment can be represented (using an XML schema defined as HR-XML) with the following hierarchical semantic structure:

```
<ContactInfo>
    <PersonName>
        <FormattedName>Bob K Smith</FormattedName>
        <GivenName>Bob</GivenName>
        <MiddleName>K</MiddleName>
        <FamilyName>Smith</FamilyName>
    </PersonName>
    <ContactMethod>
        <Use>personal</Use>
        <Location>home</Location>
```

```
        <WhenAvailable>anytime</WhenAvailable>
        <PostalAddress type="undefined">
            <CountryCode>US</CountryCode>
            <PostalCode>95131</PostalCode>
            <Region>CA</Region>
            <Municipality>San Jose</Municipality>
            <DeliveryAddress>
                <AddressLine>1234 My Circle</AddressLine>
            </DeliveryAddress>
        </PostalAddress>
    </ContactMethod>
    <ContactMethod>
        <Use>business</Use>
        <Location>home</Location>
        <WhenAvailable>anytime</WhenAvailable>
        <Telephone>
            <AreaCityCode>408</AreaCityCode>
            <SubscriberNumber>123-4567</SubscriberNumber>
        </Telephone>
    </ContactMethod>
    <ContactMethod>
        <Use>personal</Use>
        <Location>home</Location>
        <WhenAvailable>anytime</WhenAvailable>
        <InternetEmailAddress>bob_k_smith@hotmail.com</InternetEmailAddress>
    </ContactMethod>
</ContactInfo>
```

The engine inserts 304 the structure from the reference and target documents into the knowledge base(s), and matches 306 semantic structure of the document to "base" knowledge bases, connecting the document into a semantic network of relationships represented by concepts in the knowledge bases. To perform this function, the engine can interpret the structure of the document to determine which knowledge bases should be matched against the fielded text data. This process may involve using several different text fields to determine a connection between a document element and a concept in a knowledge base. For example, considering an employment description on the rèsumè of Bob Smith in which he worked as a Senior Software Engineer at ANNUNCIO Software, this employment description can be represented by the following XML structure:

```
<EmploymentHistory>
    <EmployerOrg>
        <EmployerOrgName>Annuncio Software</EmployerOrgName>
        <PositionHistory positionType="directHire" currentEmployer="true">
            <Title>Senior Software Engineer</Title>
            <OrgName>
                <OrganizationName>Annuncio Software</OrganizationName>
            </OrgName>
            <OrgInfo>
                <PositionLocation type="undefined">
                    <CountryCode>US</CountryCode>
                    <Region>CA</Region>
                    <Municipality>Mountain View</Municipality>
                </PositionLocation>
                <WebSite />
            </OrgInfo>
            <Description>Senior Software Engineer.
Feb 2000 - Present
Annuncio Software, Mountain View, CA[*]
Lead the design and development efforts for a Java enterprise application
for eMarketing. Technology used included: Servlet, XML, and EJB. Tools
used included Tomcat and iPlanet Application Server.
Designed, developed and implemented the application s multi-threaded
runtime engine, APIs and Oracle stored procedures.
Involved with various phases of the new product: building of the
prototype, market validation, MRD reviews, writing and reviewing of
functional and design specs.
Drive the integration design and development efforts with existing product
line.</Description>
            <StartDate>
                <AnyDate>2000-02-01</AnyDate>
            </StartDate>
            <EndDate>
                <AnyDate>2005-04-25</AnyDate>
            </EndDate>
        </PositionHistory>
    </EmployerOrg>
```

The engine can further analyze this structure and insert 308 links into the knowledge base to create a connection between this employment description structure and the "base" knowledge bases, including 1) Companies in a CompanyKB, 2) Titles in a TitleKB, 3) Locations in a LocationKB, and 4) Skills in a SkillKB. The result of the above document tagging process example can be represented by the following section of an XML document:

```
<CandidateEmployment id="973" >
    <Candidate>
        <Candidate id="167" ucl="//CandidateKB.Candidate:167//Bob+K+Smith"/>
    </Candidate>
    <CompanyString>Annuncio Software</CompanyString>
    <OrganizationName>Annuncio Software</OrganizationName>
    <Companies>
        <CompanyKB.Company id="2148"
ucl="//CompanyKB.Company:rfxvqwl76vc389wjtg7obgt7jc//Oracle+Corporation/Annuncio+Software+Inc."/>
    </Companies>
    <TitleString>Senior+Software+Engineer</TitleString>
    <TitleSeniorities>
        <TitleKB.TitleSeniority id="3"
ucl="//TitleKB.TitleSeniority:nnbo2rsy2rdivpgivjcy7jnj3b//Senior"/>
    </TitleSeniorities>
    <TitleFields>
        <TitleKB.TitleField id="1486"
ucl="//TitleKB.TitleField:4fpcpiyqk5cgfoibr3er2hnard//Engineering/Engineer/Software+Engineer"/>
    </TitleFields>
    <Location>
        <LocationKB.Location id="26780"
```

-continued ucl="//LocationKB.Location:3ltxjchvbbdbllmh4nmmo6houb/Bay+Area%3FLocationType%3D%2F%2F
%3Anfaxplqmhzfnzpgilp2iwu3fmc%2F%2Fdivision1/650%3FLocationType%3D%2F%2F%3Asilhmaziibf
uhkgjmfxpsfg2ie%2F%2Fregion%2Fareacode/Palo+Alto%3FLocationType%3D%2F%2F%3Ahb7lpl255fg
lvj7ijaidu6djla%2F%2Fcity"/>
                     </Location>
                     <Department></Department>
                     <EmploymentYears>5.60029009474738</EmploymentYears>
                     <StartDate>02%2F01%2F2000+12%3A00+AM</StartDate>
                     <EndDate>03%2F12%2F2300+12%3A00+AM</EndDate>
                     <Summary>Senior+Software+Engineer%5B*%5D.++Feb+2000+–
+Present%0AAnnuncio+Software%2C+Mountain+View%2C+CA%0A%0ALead+the+design+and+development
+efforts+for+a+Java+enterprise+application+for+eMarketing.++Technology+used+included
%3A+Servlet%2C+XML%2C+and+EJB.+Tools+used+included+Tomcat+and+iPlanet+Application+Server
.%0A%0ADesigned%2C+developed+and+implemented+the+application+s+multi-
threaded+runtime+engine%2C+APIs+and+Oracle+stored+procedures.%0A%0AInvolved+with+various
+phases+of+the+new+product%3A+building+of+the+prototype%2C+market+validation%2C+MRD+
reviews%2C+writing+and+reviewing+of+functional+and+design+specs.%0A%0ADrive+the+integration
+design+and+development+efforts+with+existing+product+line.</Summary>
<ConcurrentEmploymentDensityRatio>1.0</ConcurrentEmploymentDensityRatio>
               <CandidateSkills>
                   <CandidateSkill id="12946"
ucl="//CandidateKB.CandidateSkill:12946//Writing+Skills+"/>
                   <CandidateSkill id="12908"
ucl="//CandidateKB.CandidateSkill:12908//Software+Development+"/>
                   <CandidateSkill id="12945"
ucl="//CandidateKB.CandidateSkill:12945//Software+Engineering+"/>
                   <CandidateSkill id="12935"
ucl="//CandidateKB.CandidateSkill:12935//Presentation+Software+"/>
                   <CandidateSkill id="12920"
ucl="//CandidateKB.CandidateSkill:12920//XML+%28EXtensible+Markup+Language%29+"/>
                   <CandidateSkill id="12919"
ucl="//CandidateKB.CandidateSkill:12919//Java+"/>
                   <CandidateSkill id="12933"
ucl="//CandidateKB.CandidateSkill:12933//iPlanet+Application+Server+"/>
                   <CandidateSkill id="12921"
ucl="//CandidateKB.CandidateSkill:12921//Enterprise+JavaBeans+%28EJB%29+"/>
                   <CandidateSkill id="12944"
ucl="//CandidateKB.CandidateSkill:12944//Software+Design+"/>
                   <CandidateSkill id="12904"
ucl="//CandidateKB.CandidateSkill:12904//Oracle+Database+"/>
                   <CandidateSkill id="12939"
ucl="//CandidateKB.CandidateSkill:12939//Stored+Procedures+"/>
                   <CandidateSkill id="12937"
ucl="//CandidateKB.CandidateSkill:12937//Prototyping+"/>
                   <CandidateSkill id="12928"
ucl="//CandidateKB.CandidateSkill:12928//Java+Servlets+"/>
                   <CandidateSkill id="12923"
ucl="//CandidateKB.CandidateSkill:12923//Tomcat+"/>
                   <CandidateSkill id="12941"
ucl="//CandidateKB.CandidateSkill:12941//Marketing+Requirements+Document+%28MRD%29+"/>
                   <CandidateSkill id="12936"
ucl="//CandidateKB.CandidateSkill:12936//Enterprise+Applications+"/>
               </CandidateSkills>
               <KeywordSearchBlob>Senior+Software+Engineer%5B*%5D.++Feb+2000+–
+Present%0AAnnuncio+Software%2C+Mountain+View%2C+CA%0A%0ALead+the+design+and+development
+efforts+for+a+Java+enterprise+application+for+eMarketing.++Technology+used+included
%3A+Servlet%2C+XML%2C+and+EJB.+Tools+used+included+Tomcat+and+iPlanet+Application+Server
.%0A%0ADesigned%2C+developed+and+implemented+the+application+s+multi-
threaded+runtime+engine%2C+APIs+and+Oracle+stored+procedures.%0A%0AInvolved+with+various
+phases+of+the+new+product%3A+building+of+the+prototype%2C+market+validation%2C+MRD+
reviews%2C+writing+and+reviewing+of+functional+and+design+specs.%0A%0ADrive+the+integration
+design+and+development+efforts+with+existing+product+line.</KeywordSearchBlob>
         </CandidateEmployment>

In another example, a course description can be represented by the following XML structure:

```xml
<CourseDescription>
<UniqueIdString>
        ad_01_a02_bs_enus
</UniqueIdString>
<Title>
        Administrative Professionals: Common Administrative Support Tasks
</Title>
<Overview>
        When it comes to a typical day at the office for an administrative professional, each
        day's planned agenda can change on a whim. Whether it be unexpected meeting requests to
        juggle, a last-minute announcement the boss needs to communicate, or a sudden request from
        the boss that shifts priorities, the tasks performed in a typical day are varied and ever-
        changing. But regardless of how much the agenda changes from day to day, there are
        standard tasks that every administrative professional will perform regularly. This course
        describes common administrative support tasks. Specifically, it covers the stages of the
        records management life cycle and details the different types of classification systems
        used for sorting records. The course also discusses the key tasks involved in arranging
        business travel, including considerations for international travel. Finally, the course
        describes the steps for planning and scheduling meetings, as well as the key techniques
        for recording meetings.
</Overview>
<LessonBlock>
        Course Overview|Working with Records| - use the alphabetic, numeric, and alphanumeric
        classification systems to sort given records|Making Business Travel Arrangements|  -
        recognize how to plan a business trip|  -  identify the main considerations for
        international travel|Planning and Recording Meetings| - recognize how to plan and schedule
        meetings| - identify steps to take when recording meetings|
</LessonBlock>
<Prerequisites>none</Prerequisites>
<TargetAudience>
        Employees in administrative support positions, as well as individuals who want to refresh
        their administrative skills
</TargetAudience>
<LaunchURL>
        http://monster.cyberu.com/entry/Course%20Details?loid=0b7cf142-8c07-47c9-af31-
        5aa1865b0cf31.0p01%26utm_source=Admin
</LaunchURL>
<Language>enus</Language>
<Duration>1:00:00</Duration>
<SourceName>1.2</SourceName>
</CourseDescription>
```

The engine can further analyze this XML structure and insert links into the knowledge base to create a connection between this course description structure and the "base" knowledge bases, including 1) Titles in a TitleKB, and 2) Skills in a SkillKB. The result of the above document tagging process example can be represented by the following section of an XML document:

```xml
<?xml version="1.0" encoding="utf-8"?>
<ConceptSet url_encode_text="false"><KnowledgeBase label="CourseKB">
    <Course id="8240" >
        <GUID>edgj3mnmsndz3fsja7umlddyoh</GUID>
        <Status>1</Status>
        <ExternalId>ad_01_a02_bs_enus</ExternalId>
        <Version></Version>
        <AssetType></AssetType>
        <LaunchURL>http://monster.cyberu.com/entry/Course%20Details?loid=0b7cf142-8c07-47c9-af31-5aa1865b0cf31.0p01%26utm_source=Admin&amp;xts=112</LaunchURL>
        <Language>enus</Language>
        <Title>Administrative Professionals: Common Administrative Support Tasks</Title>
        <Duration>1:00:00</Duration>
        <Overview>When it comes to a typical day at the office for an administrative
professional, each day's planned agenda can change on a whim. Whether it be unexpected meeting
requests to juggle, a last-minute announcement the boss needs to communicate, or a sudden request
from the boss that shifts priorities, the tasks performed in a typical day are varied and ever-
changing. But regardless of how much the agenda changes from day to day, there are standard tasks
that every administrative professional will perform regularly. This course describes common
administrative support tasks. Specifically, it covers the stages of the records management life
cycle and details the different types of classification systems used for sorting records. The
course also discusses the key tasks involved in arranging business travel, including
considerations for international travel. Finally, the course describes the steps for planning and
``` scheduling meetings, as well as the key techniques for recording meetings.</Overview>
                <PrerequisitesInputString>none</PrerequisitesInputString>
                <TargetAudience>Employees in administrative support positions, as well as individuals who want to refresh their administrative skills</TargetAudience>
                <LessonBlock>Course Overview|Working with Records| - use the alphabetic, numeric, and alphanumeric classification systems to sort given records|Making Business Travel Arrangements| - recognize how to plan a business trip| - identify the main considerations for international travel|Planning and Recording Meetings| - recognize how to plan and schedule meetings| - identify steps to take when recording meetings|<LessonBlock>
                <CourseSkills>
                    <CourseSkill id="57690" >
                        <GUID>wgq2bw2ktrhdjme7wxncuvlihh</GUID>
                        <YearsOfExperience>0.0</YearsOfExperience>
                        <YearsOfExperienceString></YearsOfExperienceString>
                        <Course>
                            <Course id="8240" />
                        </Course>
                        <SkillStringStatus>1</SkillStringStatus>
                        <SkillObject>
                            <SkillKB.SkillObject id="3929" ucl="//SkillKB.SkillObject:xhtr7xa3afg2ti5jxxpon4octh/"/>
                        </SkillObject>
                        <CourseRequirement>
                            <CourseRequirement id="7" ucl="//CourseKB.CourseRequirement/"/>
                        </CourseRequirement>
                    </CourseSkill>
                    <CourseSkill id="57691" >
                        <GUID>55sor2s3kzgv3lep56cir3adpf</GUID>
                        <YearsOfExperience>0.0</YearsOfExperience>
                        <YearsOfExperienceString></YearsOfExperienceString>
                        <Course>
                            <Course id="8240" />
                        </Course>
                        <SkillStringStatus>1</SkillStringStatus>
                        <SkillObject>
                            <SkillKB.SkillObject id="5065" ucl="//SkillKB.SkillObject:2hqnqjctbfcbbikpolggt4ugef/"/>
                        </SkillObject>
                        <CourseRequirement>
                            <CourseRequirement id="7" ucl="//CourseKB.CourseRequirement/"/>
                        </CourseRequirement>
                    </CourseSkill>
                    <CourseSkill id="57692" >
                        <GUID>hp2eq7enjndz5hpmvzfncr3dnb</GUID>
                        <YearsOfExperience>0.0</YearsOfExperience>
                        <YearsOfExperienceString></YearsOfExperienceString>
                        <Course>
                            <Course id="8240" />
                        </Course>
                        <SkillStringStatus>1</SkillStringStatus>
                        <SkillObject>
                            <SkillKB.SkillObject id="5052" ucl="//SkillKB.SkillObject:2sixkd7g6zbdzpopxsujtn64ia/"/>
                        </SkillObject>
                        <CourseRequirement>
                            <CourseRequirement id="7" ucl="//CourseKB.CourseRequirement/"/>
                        </CourseRequirement>
                    </CourseSkill>
                    <CourseSkill id="57693" >
                        <GUID>e6ifiimlybfijmbtxa2dqpji7g</GUID>
                        <YearsOfExperience>0.0</YearsOfExperience>
                        <YearsOfExperienceString></YearsOfExperienceString>
                        <Course>
                            <Course id="8240" />
                        </Course>
                        <SkillStringStatus>1</SkillStringStatus>
                        <SkillObject>
                            <SkillKB.SkillObject id="5051" ucl="//SkillKB.SkillObject:gn2ji3jqizgsngelisxehjpe5h/"/>
                        </SkillObject>
                        <CourseRequirement>
                            <CourseRequirement id="7" ucl="//CourseKB.CourseRequirement/"/>
                        </CourseRequirement>
                    </CourseSkill>
                    <CourseSkill id="57694" >
                        <GUID>bw2hs4pnrrhtrpgcoomyolajzh</GUID>
                        <YearsOfExperience>0.0</YearsOfExperience>
                        <YearsOfExperienceString></YearsOfExperienceString>
                        <Course>

```xml
            <Course id="8240" />
        </Course>
        <SkillStringStatus>1</SkillStringStatus>
        <SkillObject>
            <SkillKB.SkillObject id="1388" ucl="//SkillKB.SkillObject:tibryzn4xzaivjo2uvgisbrxdh/"/>
        </SkillObject>
        <CourseRequirement>
            <CourseRequirement id="7" ucl="//CourseKB.CourseRequirement/"/>
        </CourseRequirement>
    </CourseSkill>
    <CourseSkill id="57695" >
        <GUID>pditttepsvce3ohapldcswinwc</GUID>
        <YearsOfExperience>0.0</YearsOfExperience>
        <YearsOfExperienceString></YearsOfExperienceString>
        <Course>
            <Course id="8240" />
        </Course>
        <SkillStringStatus>1</SkillStringStatus>
        <SkillObject>
            <SkillKB.SkillObject id="1368" ucl="//SkillKB.SkillObject:5pvgdplbxrhqdf6rxmz4ji5dha/"/>
        </SkillObject>
        <CourseRequirement>
            <CourseRequirement id="7" ucl="//CourseKB.CourseRequirement/"/>
        </CourseRequirement>
    </CourseSkill>
    <CourseSkill id="57696" >
        <GUID>bskjelbaibdedabb4mdmskoeqb</GUID>
        <YearsOfExperience>0.0</YearsOfExperience>
        <YearsOfExperienceString></YearsOfExperienceString>
        <Course>
            <Course id="8240" />
        </Course>
        <SkillStringStatus>1</SkillStringStatus>
        <SkillObject>
            <SkillKB.SkillObject id="3929" ucl="//SkillKB.SkillObject:xhtr7xa3afg2ti5jxxpon4octh/"/>
        </SkillObject>
        <CourseRequirement>
            <CourseRequirement id="7" ucl="//CourseKB.CourseRequirement/"/>
        </CourseRequirement>
    </CourseSkill>
    <CourseSkill id="57697" >
        <GUID>wrymfx5wojgcbe6zcw7mlxzgzc</GUID>
        <YearsOfExperience>0.0</YearsOfExperience>
        <YearsOfExperienceString></YearsOfExperienceString>
        <Course>
            <Course id="8240" />
        </Course>
        <SkillStringStatus>1</SkillStringStatus>
        <SkillObject>
            <SkillKB.SkillObject id="5065" ucl="//SkillKB.SkillObject:2hqnqjctbfcbbikpolggt4ugef/"/>
        </SkillObject>
        <CourseRequirement>
            <CourseRequirement id="7" ucl="//CourseKB.CourseRequirement/"/>
        </CourseRequirement>
    </CourseSkill>
    <CourseSkill id="57698" >
        <GUID>gf2fqxjxdrddpma5r54i6e2f3d</GUID>
        <YearsOfExperience>0.0</YearsOfExperience>
        <YearsOfExperienceString></YearsOfExperienceString>
        <Course>
            <Course id="8240" />
        </Course>
        <SkillStringStatus>1</SkillStringStatus>
        <SkillObject>
            <SkillKB.SkillObject id="212" ucl="//SkillKB.SkillObject:rtm4zcyjuzbw512apgjunzpn6d/"/>
        </SkillObject>
        <CourseRequirement>
            <CourseRequirement id="7" ucl="//CourseKB.CourseRequirement/"/>
        </CourseRequirement>
    </CourseSkill>
    <CourseSkill id="57699" >
        <GUID>ajg7irlb6fdnvf4nw32awwxosc</GUID>
        <YearsOfExperience>0.0</YearsOfExperience>
        <YearsOfExperienceString></YearsOfExperienceString>
```

```
                    <Course>
                        <Course id="8240" />
                    </Course>
                    <SkillStringStatus>1</SkillStringStatus>
                    <SkillObject>
                        <SkillKB.SkillObject id="4965"
ucl="//SkillKB.SkillObject:r6rp4ayuvza6jatuuvdt6rh4ug/"/>
                    </SkillObject>
                    <CourseRequirement>
                        <CourseRequirement id="7" ucl="//CourseKB.CourseRequirement/"/>
                    </CourseRequirement>
                </CourseSkill>
                <CourseSkill id="57700" >
                    <GUID>7of36ol7w5hs3ijnkuyzmbtwtc</GUID>
                    <YearsOfExperience>0.0</YearsOfExperience>
                    <YearsOfExperienceString></YearsOfExperienceString>
                    <Course>
                        <Course id="8240" />
                    </Course>
                    <SkillStringStatus>1</SkillStringStatus>
                    <SkillObject>
                        <SkillKB.SkillObject id="5052"
ucl="//SkillKB.SkillObject:2sixkd7g6zbdzpopxsujtn64ia/"/>
                    </SkillObject>
                    <CourseRequirement>
                        <CourseRequirement id="7" ucl="//CourseKB.CourseRequirement/"/>
                    </CourseRequirement>
                </CourseSkill>
            </CourseSkills>
            <CourseTitleSkills>
                <CourseTitleSkill id="10262" >
                    <GUID>ya4xudpvajb6fetoukv3mrcclb</GUID>
                    <Course>
                        <Course id="8240" />
                    </Course>
                    <SkillObject>
                        <SkillKB.SkillObject id="5051"
ucl="//SkillKB.SkillObject:gn2ji3jqizgsngelisxehjpe5h/"/>
                    </SkillObject>
                    <CourseRequirement>
                        <CourseRequirement id="7" ucl="//CourseKB.CourseRequirement/"/>
                    </CourseRequirement>
                </CourseTitleSkill>
            </CourseTitleSkills>
            <CourseEmployments>
                <CourseEmployment id="14930" >
                    <GUID>nllvkcpu6bbm51mmdirx6zpsbc</GUID>
                    <Course>
                        <Course id="8240" />
                    </Course>
                    <CompanyStringStatus>1</CompanyStringStatus>
                    <TitleStringStatus>1</TitleStringStatus>
                    <TitleField>
                        <TitleKB.TitleField id="6778"
ucl="//TitleKB.TitleField:db5moatnqjczxbtx4jllgppnwh/"/>
                    </TitleField>
                    <LocationStringStatus>1</LocationStringStatus>
                    <EmploymentYearsString></EmploymentYearsString>
                    <CourseRequirement>
                        <CourseRequirement id="6" ucl="//CourseKB.CourseRequirement/"/>
                    </CourseRequirement>
                </CourseEmployment>
            </CourseEmployments>
            <OriginalBlob>Administrative Professionals: Common Administrative Support Tasks When
it comes to a typical day at the office for an administrative professional, each day's
planned agenda can change on a whim. Whether it be unexpected meeting requests to juggle, a last-
minute announcement the boss needs to communicate, or a sudden request from the boss that shifts
priorities, the tasks performed in a typical day are varied and ever-changing. But regardless of
how much the agenda changes from day to day, there are standard tasks that every administrative
professional will perform regularly. This course describes common administrative support tasks.
Specifically, it covers the stages of the records management life cycle and details the different
types of classification systems used for sorting records. The course also discusses the key tasks
Involved in arranging business travel, including considerations for international travel.
Finally, the course describes the steps for planning and scheduling meetings, as well as the key
techniques for recording meetings. Course Overview|Working with Records|  -  use the alphabetic,
numeric, and alphanumeric classification systems to sort given records|Making Business Travel
Arrangements|  -   recognize how to plan a business trip|  -  identify the main considerations for
international travel|Planning and Recording Meetings|  -  recognize how to plan and schedule
meetings|  -  identify steps to take when recording meetings|  none Employees in administrative
```

```
support positions, as well as individuals who want to refresh their administrative skills
<CourseDescription>
        <UniqueIdString>ad_01_a02_bs_enus</UniqueIdString>
        <Title>Administrative Professionals: Common Administrative Support
Tasks</Title>
        <Overview>When it comes to a typical day at the office for an administrative
professional, each day&apos;s planned agenda can change on a whim. Whether it be unexpected
meeting requests to juggle, a last-minute announcement the boss needs to communicate, or a sudden
request from the boss that shifts priorities, the tasks performed in a typical day are varied and
ever-changing. But regardless of how much the agenda changes from day to day, there are standard
tasks that every administrative professional will perform regularly. This course describes
common administrative support tasks. Specifically, it covers the stages of the records management
life cycle and details the different types of classification systems used for sorting records.
The course also discusses the key tasks involved in arranging business travel, including
considerations for international travel. Finally, the course describes the steps for planning and
scheduling meetings, as well as the key techniques for recording meetings.</Overview>
        <LessonBlock>Course Overview|Working with Records|  -  use the alphabetic, numeric,
and alphanumeric classification systems to sort given records|Making Business Travel
Arrangements|  -  recognize how to plan a business trip|  -  identify the main considerations for
international travel| Planning and Recording Meetings|  -  recognize how to plan and schedule
meetings|  -  identify steps to take when recording meetings|</LessonBlock>
        <Prerequisites>none</Prerequisites>
        <TargetAudience>Employees in administrative support positions, as well as
individuals who want to refresh their administrative skills</TargetAudience>
        <LaunchURL>http://monster.cyberu.com/entry/Course%20Details?loid=0b7cf142-8c07-47c9-
af31-5aa1865b0cf31.0p01%26utm_source=Admin</LaunchURL>
        <Language>enus</Language>
        <Duration>1:00:00</Duration>
        <SourceName>1.2</SourceName>
        </CourseDescription></OriginalBlob>
            <SourceName>1.2</SourceName>
            <BodyText> When it comes to a typical day at the office for an administrative
professional, each day's planned agenda can change on a whim. Whether it be unexpected
meeting requests to juggle, a last-minute announcement the boss needs to communicate, or a sudden
request from the boss that shifts priorities, the tasks performed in a typical day are varied and
ever-changing. But regardless of how much the agenda changes from day to day, there are standard
tasks that every administrative professional will perform regularly. This course describes
common administrative support tasks. Specifically, it covers the stages of the records management
life cycle and details the different types of classification systems used for sorting records.
The course also discusses the key tasks involved in arranging business travel, including
considerations for international travel. Finally, the course describes the steps for planning and
scheduling meetings, as well as the key techniques for recording meetings. Course
Overview|Working with Records|  -  use the alphabetic, numeric, and alphanumeric classification
systems to sort given records|  Making Business Travel Arrangements|  -  recognize how to plan a
business trip|  -  identify the main considerations for international travel|Planning and Recording
Meetings|  -  recognize how to plan and schedule meetings|  -  identify steps to take when recording
meetings|   none Employees in administrative support positions, as well as individuals who want to
refresh their administrative skills</BodyText>
                <ConvertedText>Administrative Professionals: Common Administrative Support Tasks When
it comes to a typical day at the office for an administrative professional, each day's
planned agenda can change on a whim. Whether it be unexpected meeting requests to juggle, a last-
minute announcement the boss needs to communicate, or a sudden request from the boss that shifts
priorities, the tasks performed in a typical day are varied and ever-changing. But regardless of
how much the agenda changes from day to day, there are standard tasks that every administrative
professional will perform regularly. This course describes common administrative support tasks.
Specifically, it covers the stages of the records management life cycle and details the different
types of classification systems used for sorting records. The course also discusses the key tasks
Involved in arranging business travel, including considerations for international travel.
Finally, the course describes the steps for planning and scheduling meetings, as well as the key
techniques for recording meetings. Course Overview|  Working with Records|  -  use the alphabetic,
numeric, and alphanumeric classification systems to sort given records|Making Business Travel
Arrangements|  -  recognize how to plan a business trip|  -  identify the main considerations for
international travel|  Planning and Recording Meetings|  -  recognize how to plan and schedule
meetings|  -  identify steps to take when recording meetings|   none Employees in administrative
support positions, as well as individuals who want to refresh their administrative skills has
external id ad_01_a02_bs_enus</ConvertedText>
            </Course>
        </KnowledgeBase>
    </ConceptSet>
```

As stated above, this information extraction and tagging process is described in detail in the above-mentioned Contextual Personalized Information Retrieval Application.

III. Wish List Search

To identify courses that are relevant to a user's job search, the search engine 100 performs various multi-way searches of the knowledge bases. Generally, the search engine receives an input query, and matches skills and titles criteria extracted from the input query to match job descriptions in the RequisitionKB. This first node of the multi-way search is either a wish list search (where the input query is keywords) or a reference search (where the input query is the user's resume). In a second node of the multi-way search, each of resulting job descriptions from the first node is used in a reference search of the CourseKB to identify courses that match the skills and titles in the job descriptions. The details of wish list and reference searches are now described.

Figure 4:
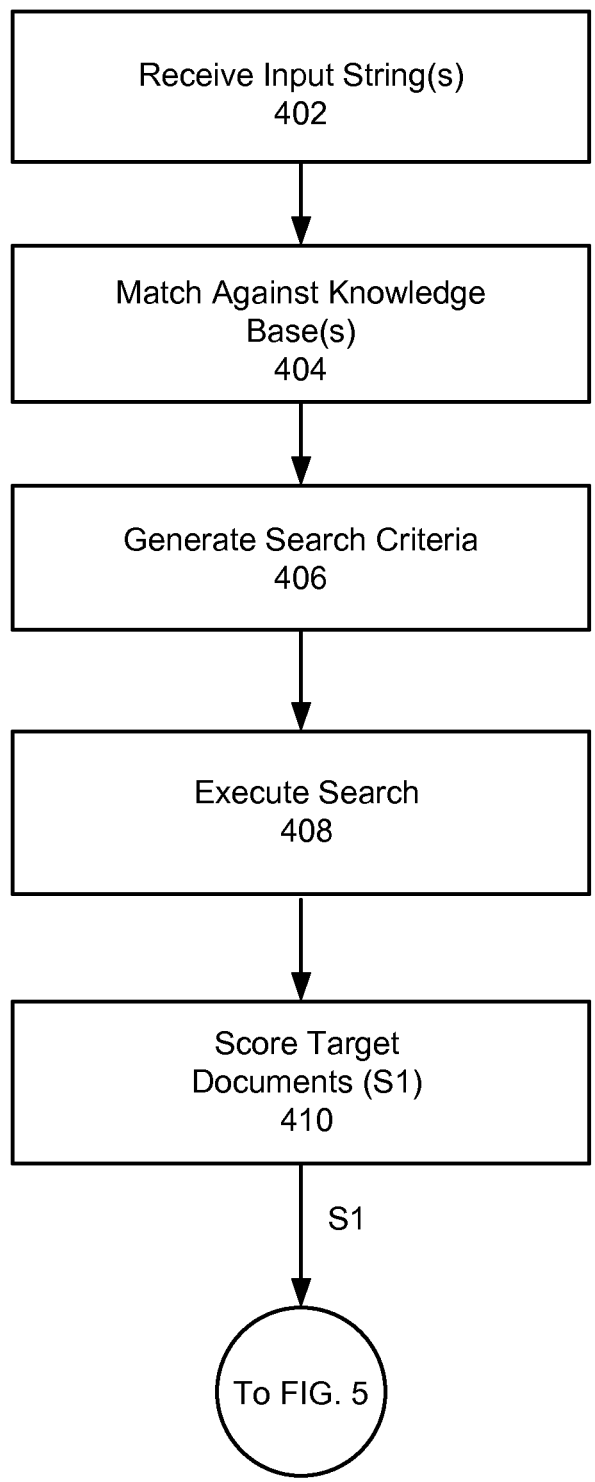
FIG. 4 is a flowchart illustrating steps performed in a wish list search according to one embodiment of the invention.

Referring now to FIG. 4, there is shown a flowchart illustrating the operation of the search engine 100 in the construction of a multi-way nested search, according to some embodiments of the present invention. This searching portion of the process is typically performed on-line, allowing a user to utilize the one or more knowledge bases created off-line to conduct a search for information based on a set of search criteria to return a ranked set of documents or information objects. This personalized information retrieval process, and systems and methods of implementing the process are described in detail in the above-mentioned Contextual Personalized Information Retrieval Application. Thus, the on-line search process is described herein only in relation to the embodiment of multi-way nested searching.

The search engine 100 illustrated in FIG. 1 receives 402 one or more search terms or input strings constructed by a user, and the engine 100 defines a variant of a Contextual Search from the input string called a "wish list search." Contextual Searches are described in detail in the above-mentioned Contextual Personalized Information Retrieval Applications. In a wish list search, the input is one or more search terms provided by a user (i.e., a job applicant's wish list of characteristics for a job), and this input query is mapped to the "base" knowledge bases, which are in turn linked to the knowledge bases representing the documents, e.g. the RequisitionKB (including job descriptions). The links within the system can be bi-directional, so that if a SkillKB Category (referred to above) of a knowledge base representing the documents references categories in the TitleKB, the TitleKB categories are extended to contain references to the SkillsKB Category, as well. In this manner, each skills concept can have a reference to all the job titles that reference that skill. This mapping of the user's input query can be used to create search criteria that can be applied to conduct a search of documents of a particular type (e.g., job descriptions) to produce a resulting set of relevant documents. The generation of search criteria, and construction and execution of contextual searches is described in detail in the Contextual Personalized Information Retrieval Application.

The wish list search can be defined from a single textual input string or one or more (or a set of two or more) fielded input strings. Where the input string has no fields, the engine 100 can extract the structure out of the string, and so can parse the one or more input strings into sub-strings or terms that can then be used in identifying specific concepts within the input string. For example, a sub-string of an input string of "software engineer and web server" might be "web server," which might be identified as a concept. The concepts identified in the input string can be matched 404 against the one or more knowledge bases. Search criteria are then be generated 406 from this extraction and matching process and the wish list search is executed 408. For example, the concept "web server" might be matched against a knowledge base to produce search concepts relating to web servers that might provide search results including job descriptions for "WebSphere developer" positions (even though the user didn't specifically search for "WebSphere developer"). Identification and extraction of concepts referenced in an input string of text and matching of these to defined concepts in a document is also described in more detail in the Contextual Personalized Information Retrieval Applications and in U.S. patent application Ser. No. 11/253,974, entitled "Concept Synonym Matching Engine," filed Oct. 18, 2005, which is incorporated by reference in its entirety.

In some embodiments, the input string can be used to select and score 410 the target document(s) producing a wish list search result set including a set of target documents (e.g., a set of relevant job descriptions) and target document score tuples (e.g., scores for each document in the set relative to the input string), where the target document score (the wish list score), here called "S1," is a value between −1.0 and 1.0 (−1.0=a perfectly uncorrelated match, and 1.0=a perfectly correlated match, respectively). The degree of match defines the correlation between the query and the matching target (e.g., the matching target document). As one example, if the matching target matches all the search criteria exactly, the result will be a "perfect" correlation, i.e. a correlation of 1.0. If the query contains "undesired" criteria, and the match contains only "undesired" criteria, then the result would be a perfectly uncorrelated match, i.e. a correlation of −1.0. Thus, the degree of match, or the similarity, between the search criteria and the target is the measure of correlation.

IV. Reference Search

Figure 5:
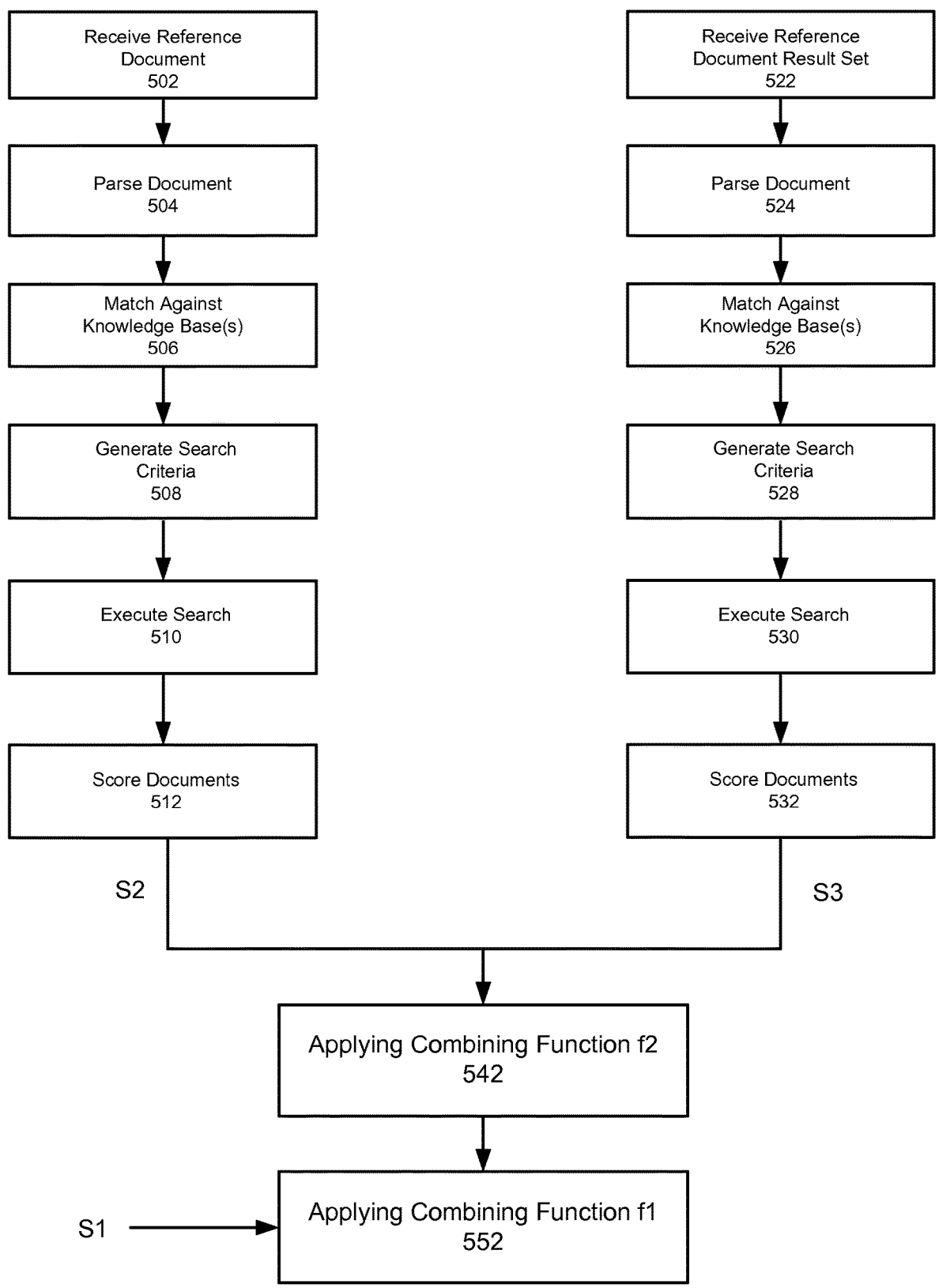
FIG. 5 is a flowchart illustrating steps performed in a reference search and reverse search, according to one embodiment of the invention.

Referring now to FIG. 5, there is shown a flowchart illustrating the operation of the search engine 100 in the construction of a multi-way nested search, according to some embodiments of the present invention. In some embodiments, the search engine 100 defines a variant of a Contextual Match Search called a "reference search." Contextual Match Searches are described in detail in the above-mentioned Contextual Personalized Information Retrieval Applications. A reference search is a search that uses a reference document, e.g. a rèsumè or a job description, as the search input. This search is referred to here as a "reference" search because, in addition to defining the search criteria, the "reference" document is also used to evaluate the search results, or in the case of rèsumès, the "reference" document is evaluated by the search results. The reference search is constructed from the knowledge base structure used to represent the reference document (i.e., knowledge bases including structure extracted from the reference document as described above regarding FIG. 3). The reference document (e.g., a rèsumè) can be received 502 as input for this search, and the reference document can be parsed 504 and matched 506 against the one or more knowledge bases. Search criteria can then be generated 508 from this matching process, and the reference search can be executed 510. The engine 100 can use the reference search to select and score 612 a set of target documents producing a reference search result set, including a set of target documents (e.g., a set of relevant job descriptions) and reference score tuples for the target documents (e.g., scores for each of the documents in the set relative to the reference document), where each reference score, here called "S2," can be implemented as a value scaled between −1.0 and 1.0, a perfectly uncorrelated match, and a perfectly correlated match, respectively. As will be further explained below, in multi-way search, the target documents from one reference search, such as job descriptions, can each be used as the reference documents for a reference search.

In some embodiments, the methods described above can be modified for constructing a reference search whereby: 1) search criteria are filtered based on a selection function that accepts as input values extracted from the reference document; and 2) weights of the search criteria are transformed based on a transformation function that accepts as input values extracted from the reference document. Thus, it is possible to construct filters to filter out certain search criteria or exclude certain search criteria. For example, in a resume search, a rule could be applied in which older skills listed on a resume are excluded from the search criteria after some defined threshold or cut off point. Similarly, the older skills could be given a very low weight and more recent skills given a higher weight in the search. The usage of filters and weights can be applied to any of the searches described here. Explanations and examples of rules that can be applied for filtering search criteria and the use of weights for search criteria are included in the Contextual Personalized Information Retrieval Application.

V. Reverse Search

In some embodiments, the search engine 100 defines for each of the target documents in the reference search result set a variant of a Contextual Match Search called a "reverse search." A reverse search is a search that can be used to evaluate a reference document. For example, a reverse search can be a combination of a reference search and the target documents that are selected by the reference search, which are then used to form a reverse search that is used to evaluate the reference document. For example, aràsumè can be a reference document, where the ràsumè is parsed and analyzed to extract search criteria. Those search criteria are used to search for job descriptions or job requisitions. Each job description that is selected by the search is in turn parsed to extract search criteria that are used to evaluate the ràsumè. This parsing and extraction can be performed offline, while the search evaluation can be performed online Thus, the reverse search is used to search for jobs for which a job candidate having a matching ràsumè is most qualified. The reverse search is constructed from the knowledge base structure used to represent the target document (i.e., knowledge bases including structure extracted from the target documents as described above regarding FIG. 3). Search criteria can thus be extracted from the matching target documents in the result set. The reference search result set of target documents can be received 522 as input for this search, and the target documents in the set can be parsed 524 and matched 526 against the one or more knowledge bases (similar to the parsing and matching described for the reference search). Search criteria can then generated 528 from this matching process and the reverse search can be executed 530. The engine 100 can use the reverse search to score 532 the target documents producing a reverse search result set including a set of target documents (e.g., a set of relevant job descriptions) and reverse search reference document score tuples (e.g., scores for each of the documents in the set), where the reverse search reference document score (the reverse score), here called "S3," is a value scaled between −1.0 and 1.0, a perfectly uncorrelated match, and a perfectly correlated match, respectively. A reverse search is employed to determine which particular courses to recommend to a job seeker based on her current resume and the jobs she is interested in.

VI. Multi-Way Searches

As mentioned about, the search engine 100 uses the wish list, reference, and reverse search for various types of multi-way searches, to identify and recommend educational courses. Generally, the search engine 100 can be configured to conduct a multi-way search by designation of various combinations of reference searches, wish list searches, and reverse searches (thereby producing search scores Sn) along with a combining function $f$, and a combination factor r. The combination function $f$ describes a function for combining the search scores, and the combining factor r describes a ratio between the search scores. If there are more than two searches that are being combined, then a weighting factor w can be used, where w is a weight assigned to each search and the combining function is a weighted average. Alternatively, the combining function can be a geometric mean of the scores of each search.

One type of multi-way search is a "two-way contextual search." In this type of search, the search engine 100 combines scores for result sets of target documents obtained from two searches (a first search and a second search) conducted to produce a secondary result set of target documents. As one example, the search engine 100 can combine a set of wish list scores with a set of reference scores. As a second example, the search engine 100 could also combine a set of reference scores with a set of reverse scores to produce a secondary result set. In the second example, the search engine 100 takes as input a reference search result set of target documents, a reverse search result set of target documents, a secondary combining function, $f2$, and a secondary combining factor, r2, where r2 is a value between 0.0 and 1.0. Here, the two-way search produces a secondary result set including a set of target documents and secondary combined score tuples, where the secondary combined score, here called "S4," is a function of the reference scores S2, the reverse scores S3 and the secondary combining factor r2. Thus, the engine 100 applies 542 the combining function, $f2$, to execute the two-way search that combines scores S2 and scores S3 producing a secondary result set of target documents, each target document in the secondary result set given a secondary combined score S4. The search engine 100 can function in a similar manner when conducting a two-way search using wish list scores and reference scores.

Another type of multi-way search is a "three-way contextual search." In this type of search, the search engine 100 combines scores for result sets of target documents obtained from three searches (a first, second, and third search) conducted to produce a primary result set of target documents. The search engine 100 can combine a set of wish list scores, a set of reference scores, and a set of reverse scores in various combinations. As one example, the search engine 100 can take as input the wish list target document result set, the secondary result set, a primary combining function, $f1$, and a primary combining factor, r1, where r1 is a value between 0.0 and 1.0. Here, the search produces a primary result set including a set of target documents and primary score tuples, where the primary score, S, is a function of the wish list scores S1 (from the wish list search), the secondary combined scores S4 (from the secondary result set) and r1. Thus, the engine 100 applies 552 a primary combining function, $f1$, to execute a three-way search that combines wish list scores S1 and secondary scores S4 producing a primary result set of target documents, each target document in the primary result set given a primary score, here called "S," representing similarity between the target documents in the primary result set and the reference document. The search engine can function in a similar manner to conduct different variations of the three-way search. For example, the three-way search might involve combining a set of wish list scores and reference scores using a secondary combining function to produce a secondary result set of target documents, and combining a scores of the secondary result set with reverse scores to produce a primary result set.

This can be further generalized into a nested multi-way search where different combinations of multiple wish list searches, reference searches, and reverse searches can be conducted to yield the most relevant search results. Any combination of nested three-way searches or two-way reverse searches can be conducted to perform n number of different searches.

Each of the searches described above can include any method that takes input search criteria and produces a set of target documents and a similarity measure between −1.0 and 1.0. Thus, the methods described above are but one mechanism by which the present invention can operate. Other embodiments include, but not are limited to, the following: 1) the methods described in the above-mentioned Contextual Personalized Information Retrieval Application; 2) a vector based similarity engine, 3) a latent semantic indexing search engine; 4) a full text search engine where the similarity measure is computed using Term Frequency Inverse Document Frequency (TFIDF); 5) a page rank engine, 6) Bayesian classification, and any combination of these, and so forth.

For the purposes of illustration and ease of discussion, the multi-way search techniques will be described below in reference to an embodiment in which the secondary combining function is used to combine reference scores and reverse scores, and the primary combining function is used to combine wish list scores and secondary combined scores. However, as described above, one of ordinary skill in the art would recognize that these searches can be performed and combined in various ways using a system and applying methods in a manner similar to that described below. Thus, the multi-way search system and methods are not in any way limited to the embodiment described below.

VII. Search Engine

Figure 6:
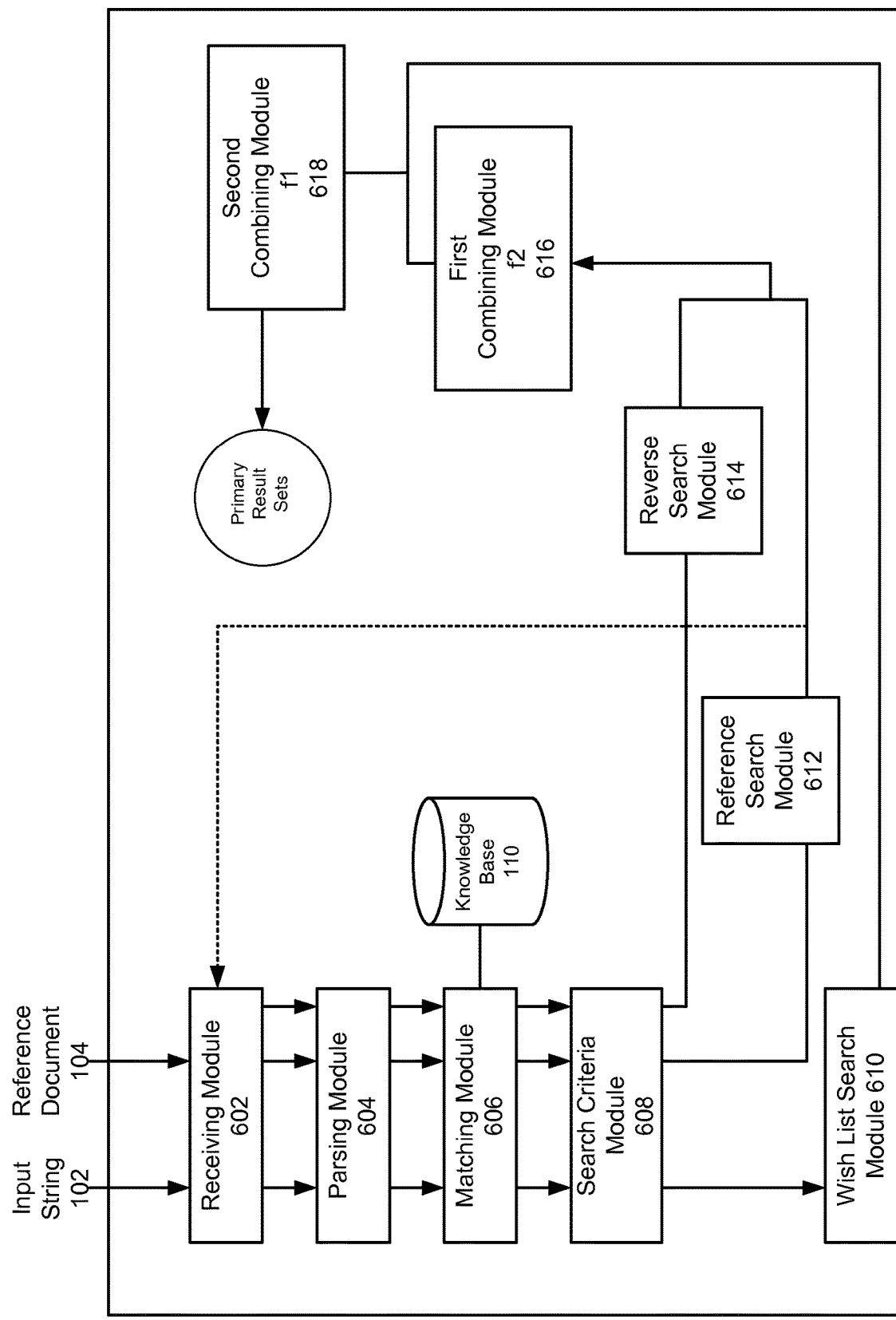
FIG. 6 is a high-level block diagram illustrating the functional modules within the search engine, according to one embodiment of the invention.

FIG. 6 is a high-level block diagram illustrating the functional modules within the search engine 100, according to an embodiment. The search engine 100, in the embodiment illustrated in FIG. 6, includes a receiving module 602, a parsing module 604, a matching module 606, a search criteria module 608, a wish list search module 610, a reference search module 612, a reverse search module 614, a first combining module 616 and a second combining module 618. Those of skill in the art will recognize that other embodiments can have different and/or additional modules than those shown in FIG. 6 and the other figures. Likewise, the functionalities can be distributed among the modules in a manner different than described herein.

The receiving module 602 receives an input query for the search engine 100. The input query might be an input string 102, a reference document 104, or a reference search result set 106 of target documents (as described above). The parsing module 604 then parses the input query where necessary and the matching module 606 matches the parsed input against the one or more knowledge bases 110 to identify a set of concepts that are descriptive of the input. The search criteria module 608 then generates search criteria for the input query based on these knowledge base results. The search criteria represent various concepts in the input query, in the form of their particular knowledge base objects.

The search modules 610, 612, and 614 execute searches based on the generated search criteria. Specifically, the wish list search module 610 takes as input the search criteria created with regard to the input string 102 and produces a wish list result set of target documents, where each document in the set is scored (the wish list scores, S1). The reference search module 612 takes as input the search criteria generated from the reference document, and produces a reference search result set of target documents, where each document in the set is scored (the reference scores, S2). The reverse search module 614 takes as input the search criteria generated from the target documents in the reference search result set 106, and produces a reverse result set of target documents, where each document in the set is scored (the reverse scores, S3). The scores for target documents in the reverse search result set and reference search result set are taken as input into the first combining module 616 which combines this input using a combining function $f2$ to produce a secondary result set of target documents, where each document in the set is scored (the secondary combined scores, S4). The scores for target documents in the secondary result set and the wish list result set are taken as input into the second combining module 618, which combines this input using a combining function $f1$ to produce a primary result set of target documents, where each document in the set is scored (the primary combined scores, S). An example of these searches in the context of a job search scenario is described below.

VIII. Searching for a Job Using a Job Requisition Search

Figure 7:
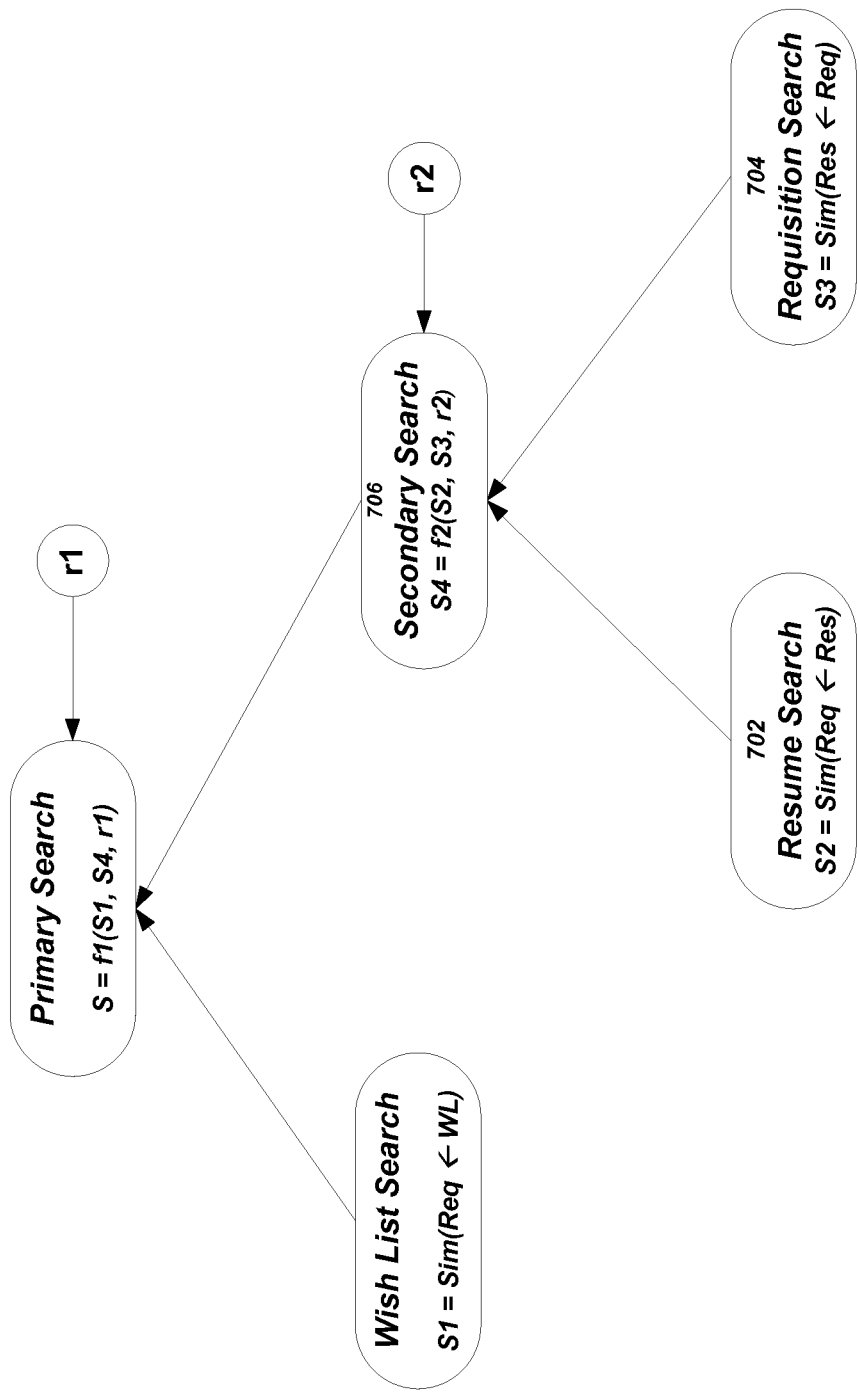
FIG. 7 is a diagram of a multi-way nested search structure, according to one embodiment of the invention.

Referring now to FIG. 7, there is shown a diagram illustrating an example of a multi-way nested search structure for a job search, according to some embodiments of the present invention. FIG. 7 illustrates a nested tree of searches that can be conducted in the multi-way search structure. Specifically, a resume search 702 (e.g., a reference search) and a requisition search (e.g., a reverse search) form two nodes of the multi-way search, and these can be combined in a secondary search 706 (e.g., a two-way search) to form a secondary result set. The secondary search 706 forms another node of the multi-way search. Still another node is represented by a wish list search 708. The wish list search 708 results and secondary search 706 results can be combined to form a primary search 710 result set (e.g., a three-way search). Thus, the wish list search 708 makes up the third arm of search structure to form a three-way search. This can be further generalized into a nested multi-way search where each/any of the nodes illustrated in the three-way search structure shown in FIG. 7 can be replaced with any combination of nested three-way searches or two-way reverse searches to perform n number of different searches. For example, it is possible to have multiple resume searches 702 and requisition searches 704 resulting in scores S2 and S3 (could have n of these), and these various searches can all feed into a function, $f2$, illustrated as the secondary search 706 in FIG. 7, which can be combined with multiple wish list searches 708 to yield the primary search 710. Each specific type of search forming the nodes of the multi-way search structure is described in more detail below in relation to a job search example.

A. Wish List Search

Where a wish list search is being conducted, the system receives one or more input strings constructed by a user (i.e., a user's wish list of desired characteristics). The wish list search can be a query that a user interactively enters on a web page, a query from a remote process encoded in a URL or similar mechanisms, a saved search persisted in a knowledge base and constructed using a variant of a Contextual Match Search (described below), and so forth. As an example, where the user is a job-seeker searching through job requisitions for a job-opening of interest, the user might enter a single textual input string to search for a software engineer job position in system software management, where some Object-Oriented programming experience is required.

Figure 8:
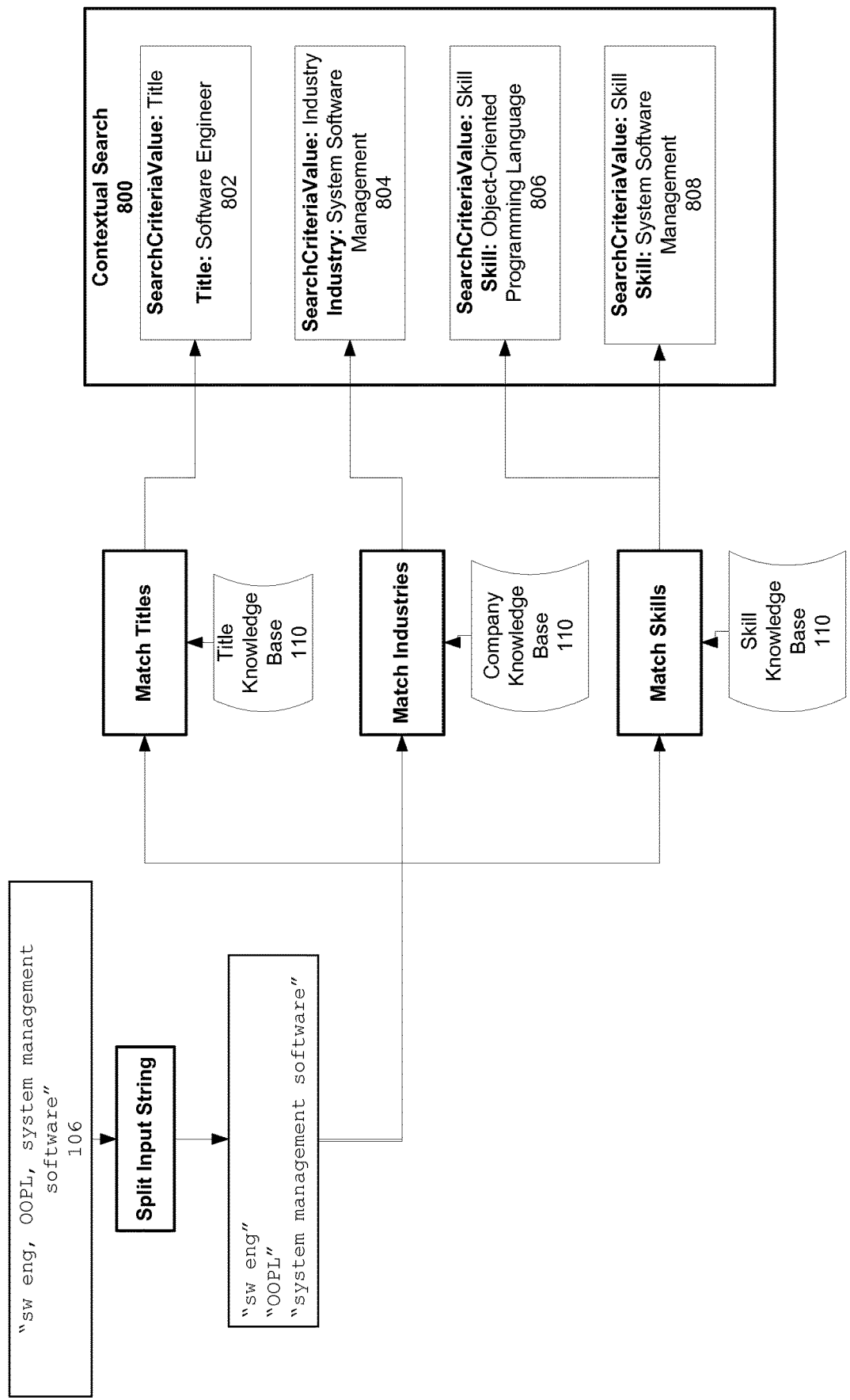
FIG. 8 is a diagram of an example of extraction and matching of an input string, according to one embodiment of the invention.

FIG. 8 illustrates an example of a wish list search. In FIG. 8, the input string 106 is matched against the one or more knowledge bases 110. In this example, the system matches titles (e.g. "Senior Engineer") with a Title Knowledge Base, industries with a Company Knowledge Base (e.g., "Apple Computer" with the "Computer" industry), and skills (e.g., "C programming") with a Skill Knowledge Base. The search criteria 802, 804, 806, 808 for the Contextual Search 800 can then be generated from this extraction and matching process. The search criteria can be either single part (e.g., one skill) or multi-part criteria (i.e., a title that can be broken down into component parts, such as the title field, the title role, etc.). These search criteria that are constructed can be the multiple different fields where the system is trying to find a match that might have a union of those or an intersection of those to produce a set that matches. In addition, conjunctive normal form can be used in searches, where the system can compute a conjunction (intersections) of a set of disjunctions (unions) of search criteria in the same "criteria group". For example, where T represents a title criteria and S represents a skill criteria, then the conjunctive normal form of a search with two title criteria and three skill criteria would be represented as (T U T) U (S U S U S). In this manner, it is possible to set up filters, where documents must meet these filters in order to be included in the result set. In some embodiments, each filter can be a group of criteria that are semantically related (e.g., titles, skills, education, location, etc.). For example, in resume search, to be included in a result set, a resume may be required to have title 1 or title 2, and may also be required to have skill 1 or skill 2 or skill 3. Similarly, it is possible to define some groups to be excluded (e.g., degrees). For example, the resume mentioned above may be required not to have a PhD or an MBA. Conjunctive normal form can be used with regard to any of the searches described here. In other embodiments, all of the criteria are required, and none are excluded from the matching process.

The example Contextual Search of FIG. 8 can be executed which produces a set of job listings (target documents) that the user/job seeker can review for job openings of interest, and a score for each job listing can be assigned.

Figure 9:
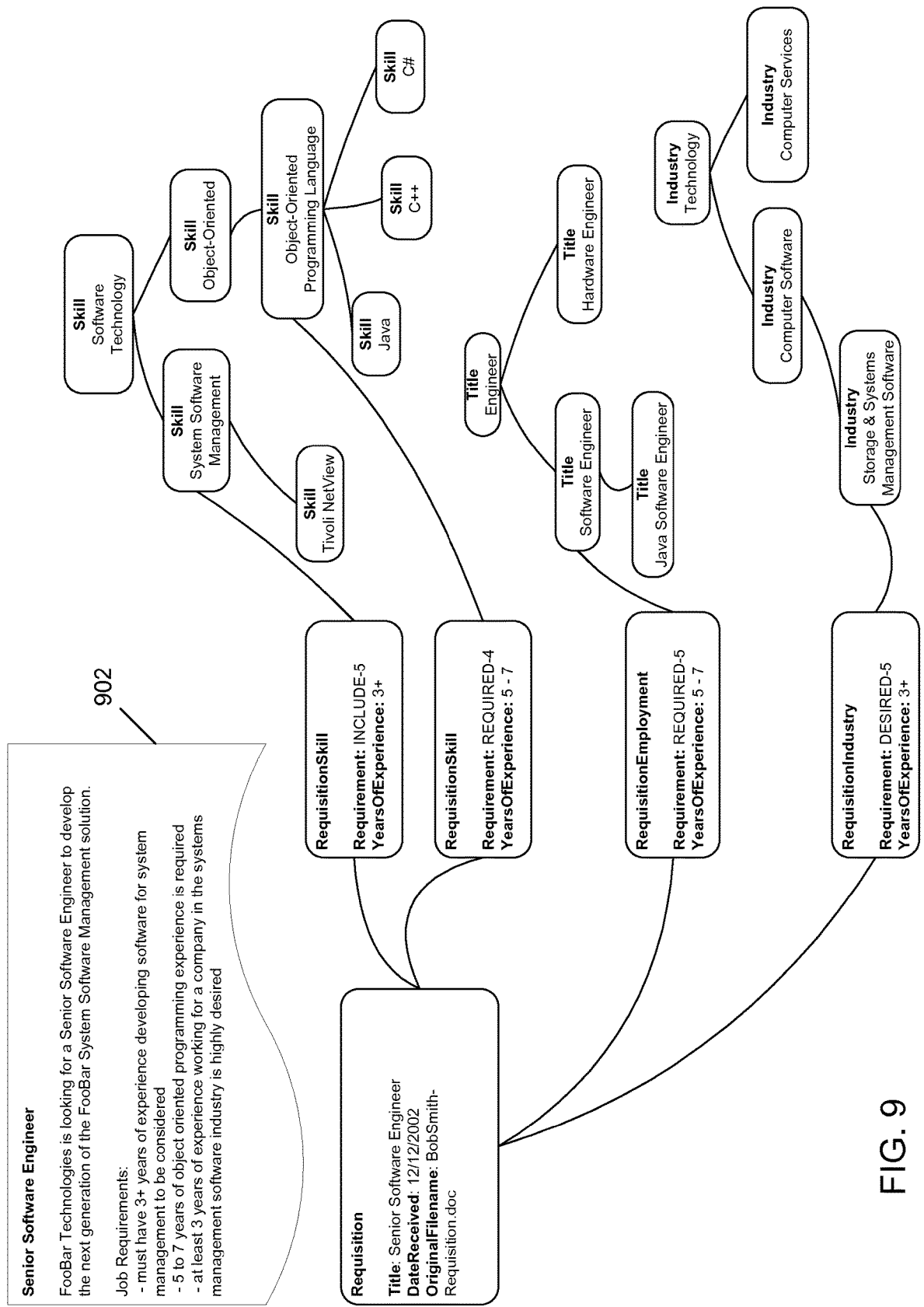
FIG. 9 is a diagram of an example knowledge base instance, according to one embodiment of the invention.

As another example of a job search, a job seeker might construct a wish list of "VP of engineering, VP of operations, web applications, on demand services." The system could parse this into the following:

Job Search
   Title
      Title Field 1: Engineer
      Title Role: VP
   Title
      Title Field 2: Operations
      Title Role: VP
   Skill
      Skill: Web Applications
   Industry
      Industry: On Demand Services There might also be a job requisition or listing that can similarly be parsed, as follows:

Job Requisition 123
   Title
      Title Field: Software Engineer
      Title Role: VP
   Skill
      Skill: Web Applications Development An example requisition knowledge base instance is illustrated in FIG. 9, showing a few of the various nodes that might be found under the Title of Engineer and how these connect up to the job requisition 902. The job requisition can connect up to various nodes in the knowledge base. For example, the requisition might match up to a Title node for Software Engineer in the knowledge base that might be connected to another Title node higher up in the hierarchy of Engineer. The Title node for Engineer might be further connected to other Title nodes, such as one for Hardware Engineer. The Title node for Software Engineer might further be linked up to a node for a Title of Java Software Engineer, and so forth. Thus, in the process of generating search criteria based on the input string described above (including as a search term "VP of engineering"), the input string might initially be matched to the knowledge base concepts at the node of Engineer as the Title. However, transitive closure can be used to pull in the various nodes underneath the Engineer node (i.e., and pull into the search results the various target documents using the term "Engineer" as a job title). Thus, the Job Requisition 123 that describes a Software Engineer might be returned to the job seeker as a search result in the set of target document results since the Title Engineer node is connected to the Title Software Engineer node, even though the search did not specifically state "software engineer." Similarly, the requisition might match up to a Skill node of Web Applications Development that is connected to a number of other nodes, and so forth, that can result in a number of other job requisitions being returned as search results.

Once the search is executed, the system matches up the search terms of the job search conducted with the various job requisitions to produce the wish list search result set that includes a set of job requisitions matched in the search and scores for each of these job requisitions. Continuing with the previous example, Job Requisition 123 (where 123 is the Target Concept ID) might be returned as a search result along with other job requisitions, such as Job Requisition 345, and each of these is scored to produce the following tuple:

| Target Concept ID | Score 1 (S1) |
| --- | --- |
| 123 | .89 |
| ... | |
| 345 | .87 |

These are the wish list scores S1 for the Job Requisitions (including Requisitions 123, 345, etc.) returned as search results relative to the input string of the wish list search. The system can select the best requisitions with the best scores to be presented as search results. This selection and scoring process is described in the above-mentioned Contextual Personalized Information Retrieval Application.

B. Resume/Reference Search

A similar type of process occurs for a resume (reference document) search shown in FIG. 7. In this case, the search takes a resume itself as input for the search, and conducts the search in a manner similar to that described above for the wish list search.

Figure 10:
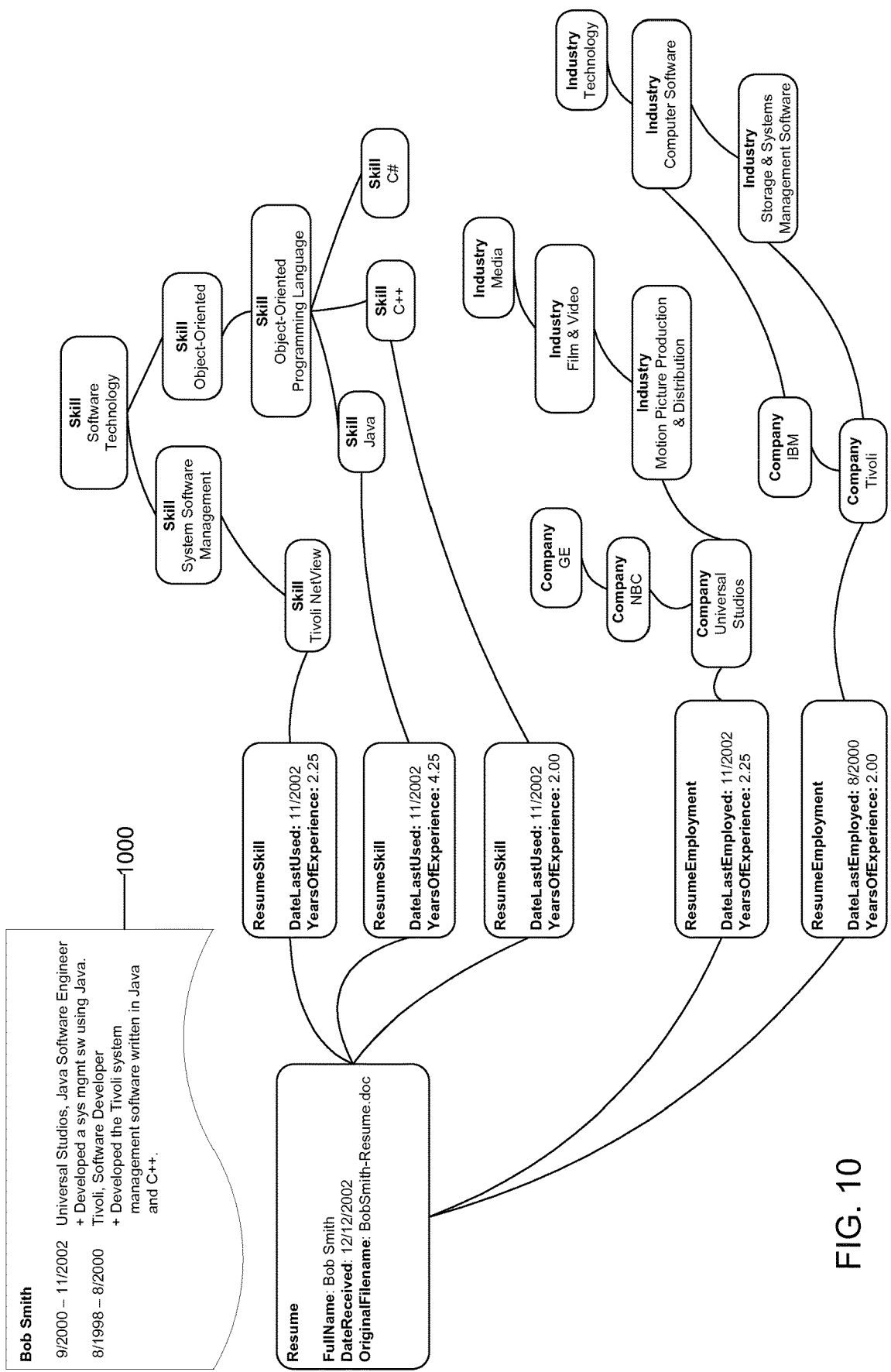
FIG. 10 is a diagram of an example knowledge base instance, according to one embodiment of the invention.

As one example, a resume will likely have an employment section or something similar that lists each workplace at which the job candidate has been employed in the past. An example is shown in FIG. 10 illustrating the resume 1000 of Bob Smith who worked at Universal Studios and at Tivoli.

For each workplace or company, the associated data can be parsed. An example of at least some of the parsing that might occur for Bob Smith's resume is as follows:

Resume Search
    Company
    Company: Universal Studios
    Title
    Title Field: Java Software Engineer
    Skill
    Skill: Java Programming
    Company
    Company: Tivoli
    Title
    Title Field: Software Developer
    Skill
    Skill: Java Programming
    Skill: C++ Programming The resume is thus taken as input in the Resume search (as opposed to the input string that is the input in the wish list search), so the input parameters are coming from the resume rather than a job search input string or wish list. The resume is parsed and matched against the one or more knowledge bases and search criteria are generated, all in a manner similar to the parsing/matching described above for the wish list search. The Contextual Match Search can be executed which produces a set of job listings (target documents) and a score for each job listing. For example, job listings for a company in the film and media or software management industries that are hiring software engineers trained in both Java and C++ would have a score close to 1.0. Job listings for companies that are not in the film and media or software management industries, but are hiring software engineers who are trained in both Java and C++ might score 0.9. Job listings for companies that are not in the film and media or software management industries, but are hiring software engineers who specifically know Java might score 0.8. Further, job listings for companies that are in the film and media or software management industries who are hiring software engineers, but do not require Java or C++ might score 0.45, and so forth. This is described in detail in the above-mentioned Contextual Personalized Information Retrieval Applications. Thus, the resume search involves searching for job requisitions, as with the wish list search, but the search involves matching the resume against the target documents to find a set of target documents that are the best matches.

Similar to the wish list search, a reference search result set of target documents is produced based on the resume search, and this result set includes a set of target documents and reference score tuples. Continuing with the previous example, Job Requisition 123 might be returned as a search result along with other job requisitions, such as Job Requisition 345, and each of these is scored to produce the following tuple:

| Target Concept ID | Score 2 (S2) |
|---|---|
| 345 | .45 |
| ... | |
| 123 | .35 |

These are the scores for the Job Requisitions (including Requisitions 123, 345, etc.) returned as search results relative to the resume input in the resume search. The system can select the best requisitions with the best scores to be presented as search results.

IX. Searching for Educational Courses that Match Criteria from Job Searches

A. Matching Job Search to Educational Courses Using a Wish List Search

Using the methods described above, a list of matching job requisitions are identified from a user's input query, using at least one of a wish list search, a reference search, or a reverse search.

As described above, the system can receive an input query comprising keywords and terms for a job that the job seeker is interested in obtaining. From the input query, the system extracts (or "tags") skills and/or job titles and associates them with corresponding skills and job titles in the SkillKB and TitleKB. The system can determine search criteria based on these tagged skills and job titles and match the criteria against the RequisitionKB. For example, search criteria can be generated from an input string of "software engineer." The input string is used to determine search criteria based on skills and job titles. For instance, search criteria can include the skill "object oriented programming language" and the job title "software engineer." The set of search criteria constructed from the tagged skills and job titles are used to select a set of matching job requisitions that are contained in the RequisitionKB. Each job requisition in the RequisitionKB is tagged to skills in the SkillKB and job titles in the TitleKB.

As a general approach, two types of searches can be conducted after a set of matching job requisitions are obtained, either a second wish list search or a reference search. For a second wish list search, the matching job requisitions are aggregated as a collection of job requisitions and analyzed to identify a set of skill concepts and title concepts that characterize the job requisitions; for example, those skills and job titles that appear most frequently, are most important within the search result set and/or generally within the RequisitionKB, or some other measure. Then, identified skill concepts and title concepts are used to form a second search criteria, and this second search criteria is used to find matching education courses in the CourseKB. The set of education courses are then ranked based on the skill and title search criteria.

For a reference search, some or all of the job requisitions resulting from the first search are used as a reference document for a search of the CourseKB. More particularly, one or more of the matching job requisitions is processed to identify a set of skill concepts and title concepts that characterize that job requisition, and these identified skill concepts and title concepts are used to form a second search criteria to be applied to the CourseKB. The search criteria resulting from these job requisitions are used in a plurality of searches of the CourseKB to find matching education courses. Finally, the resulting set of educational courses from the plurality of searches is then ranked based on the skill and title search criteria.

In yet another embodiment, the skills and job titles that are tagged with the matching set of job requisitions are analyzed to determine the most "topical" set of skills and job titles that characterize the set of job requisitions. The set of "topical" skills and titles are then used to search the CourseKB. The set of "topical" skills and job titles are used to construct search criteria that are used to select a set of matching courses. The weights of the search criteria used to select and score the courses are determined by the "topical" skill and job title concepts analysis of the selected set of job requisitions. As described in the Contextual Personalized Information Retrieval Application, the selected courses are rank ordered based on their scores.

Using the methods above, the matching educational courses are then presented to the user via a web application on the user device. The educational course can be presented as an advertisement to the user, for example in conjunction with the results of the initial search for job requisitions. In this manner the user benefits from seeing both what jobs match her job search query, as well as what educational courses may be necessary or relevant to those jobs.

B. Matching Job Search to Educational Courses Using a Reference Search

In another example, the user's resume can be used as a reference document for a reference search of the RequisitionKB, as described above. In the reference search, the user's resume (reference document) is parsed to identify one or more search criteria (e.g., skills and job titles) for the matching process. The system matches the search criteria extracted from the resume against concepts tagged to job requisitions, using the reference search method. Once the matching job requisitions are identified, they can be used for either a wish list search of the CourseKB, or a reference search of the CourseKB, as described in the previous section.

The matching educational courses can be identified using the scoring algorithms described herein. For example, as described above, matching scores with values between –0.1 and 1.0 can be assigned to the matches to indicate the degree of matching, from a perfectly uncorrelated match to a perfectly correlated match, respectively.

The matching educational courses are then presented to the user via a web application on the user device. The educational course can be presented as an advertisement to the user.

To summarize thus far, there are four different multi-way searches that can be performed C. Matching Job Search to Educational Courses Using a Combination Search In other embodiments, a combination search approach is used to identify a set of matching educational courses for the user. A user can enter both an input query and a resume to search for job requisitions, and both inputs can be used to identify matching educational courses to present to the user.

A user's input query for a wish list search is analyzed to construct a set of search criteria, as described above. In addition, a reference document, such as a resume, is analyzed to construct an additional set of search criteria. The set of search criteria constructed from the wish list search input is combined with the set of search criteria constructed from the reference document to form a single set of search criteria that are used to identify matching job requisitions, as described above.

A set of matching job requisitions is identified from the combined search criteria, and the same processes as described above are used to select and score educational courses, again using either a second wish list search (based on skills and titles extracted from the set of job requisitions) or a second reference search (using each of the job requisitions as a reference document) of the CourseKB.

Finally, both types of searches, wish list and reference search can be performed at each stage or at either stage. Thus, a wish list search using the user's search query for keywords and a reference search using the user's resume are performed on the RequisitionKB to identify matching job requisitions. Then both a wish list search (using skills and job titles extracted from the matching job descriptions) and a set of reference searches (using all or some of the matching job requisitions) are performed on the CourseKB to identify matching courses. Alternatively, either a wish list or reference search can be performed as the first search, as described above, and then a combined search performed just on the CourseKB.

To summarize thus far, there are eleven different search patterns using multi-way searching for identifying and recommending educational courses.

| First Search on RequisitionKB | Second Search on CourseKB |
| --- | --- |
| Wish list search using user keywords | Wish list search using skills and job titles extracted from matching job requisitions. |
| Wish list search using user keywords | Reference search using one or more matching job requisitions. |
| Reference search using user's resume | Wish list search using skills and job titles extracted from matching job requisitions. |
| Reference search using user's resume | Reference search using one or more matching job requisitions. |
| Combined wish list search using user keywords, and reference search using user's resume | Wish list search using skills and job titles extracted from matching job requisitions. |
| Combined wish list search using user keywords, and reference search using user's resume | Reference search using one or more matching job requisitions. |
| Combined wish list search using user keywords, and reference search using user's resume | Combined wish list search using skills and job titles extracted from matching job requisitions and reference search using one or more of the matching job requisitions. |
| Wish list search using user keywords | Combined wish list search using skills and job titles extracted from matching job requisitions and reference search using one or more of the matching job requisitions. |
| Wish list search using user keywords | Combined wish list search using skills and job titles extracted from matching job requisitions and reference search using one or more of the matching job requisitions. |
| Reference search using user's resume | Combined wish list search using skills and job titles extracted from matching job requisitions and reference search using one or more of the matching job requisitions. |

| First Search on RequisitionKB | Second Search on CourseKB |
|---|---|
| Reference search using user's resume | Combined wish list search using skills and job titles extracted from matching job requisitions and reference search using one or more of the matching job requisitions. |

D. Selecting and Weighting Skill Criteria and Job Title Criteria

Descriptions for weighting of criteria for matching purposes are described above, and in U.S. Pat. No. 7,836,060, and U.S. patent application Ser. No. 11/756,951. This section describes methods used in analyzing the requisitions to identify the set of skill and job title concepts that are used for searching educational courses and for determining the weight for each of the search criteria. There are two steps for constructing the educational course search criteria: 1) selecting a set of skill and job title concepts, and 2) determining a weight for each of the search criteria. There are multiple methods that can be used for performing these two steps.

The first step is selecting the set of skill or job title concepts that represent a collection of documents (e.g., a set of job requisitions). Each document in the collection of documents is tagged with zero, one or more skill concepts, and zero, one or more job title concepts. To determine the best set of skills that represent the collection of documents, the following process is used. First, the set of matching documents (e.g. job requisitions) that match the search criteria are determined, as defined above, and this set of documents is labeled "A." Second, for each skill in the SkillKB, a set of documents that are tagged with the given skill is identified from within the document collection "A," and this set of documents is labeled "B." This set of "B" documents is identified for each skill, so there will be a total of "N" document collections in the "B" set of documents, where N is the number of skills in the SkillKB. Some of the "B" set of document collections will have zero documents. In some embodiments, the sets with zero documents are not included in the computation, and the set of B document collections that have at least one document in the collection are included. Third, it is determined how many documents in the entire document collection, regardless of the given search, are tagged with the given skill concept, and this collection of documents is labeled as "C". In addition, the entire document collection (e.g., the entire knowledge base of job requisitions) is labeled "D".

Given these sets of documents (A, B, C and D), the most "topical" set of skill concepts (i.e., the top skills in the documents) are computed to represent any given collection of matching documents, "A," using a variety of methods described below. The same method can be used to analyze job title concepts, or any other relevant concepts described above. In some embodiments, the top skills in a given collection of documents, "A," are referred to as "required skills," or the skills that are generally required for jobs that tend to match the user's input query.

One method for selecting and scoring skill concepts that represent a collection of documents is to use a standard measure called Term Frequency-Inverse Document Frequency (TF-IDF). This is a common measure used in information retrieval to determine the relevance of documents. In this case, TF-IDF is used to determine the relevance or "topicality" of a skill concept (i.e., whether it is a "required skill").

The TF-IDF weight (term frequency-inverse document frequency) is a numerical statistic used to measure the importance or relevancy of a concept (skill or job title) to a particular job posting. A TF-IDF calculation is determined for the frequency of the skill or job title for the job posting using the following equation:

TF-IDF=(log(total frequency/partial frequency))/(log total frequency).

Using the definitions above, the Term Frequency, or TF, component of the TF-IDF calculation is the cardinality of the document collection "B" (i.e., the set of documents that are tagged with given skill concept and that are contained in the matching set of documents). In other words, "B" is equal to the intersection of the document collection C and the document collection "A." Accordingly, B=C∩A. Thus, a skill that is highly relevant to a job or frequently identified in association with a job will have a higher TF-IDF weight. For example, relevant skills for a "software engineer" could be "Java programming skills" or "C++ programming skills," and these skills would be found in a greater frequency than other job skills, such as "managerial skills" or "communication skills."

Further, in the IDF formula defined above, the total frequency is the cardinality of the document collection "D," and the partial frequency is the cardinality of the document collection "C." In other words, the Inverse Document Frequency is the log inverse frequency of the number of documents in the set of documents tagged with a given skill relative to the total number of documents. The combined TF-IDF measure, TF, as defined above, is multiplied by IDF, as defined above. This measure is a measure of how "topical" the skill is relative to the collection of matching documents (in this case, matching job requisitions).

Another method for analyzing skills is to use a Jaccard calculation. For a Jaccard calculation, the Jaccard coefficient measures similarity between sample sets, and is defined as the size of the intersection divided by the size of the union of the sample sets:

$$J(X,Y)=(X \cap Y)/(X \cup Y)$$

The Jaccard score is also used to determine which skills or job titles are most relevant for a job posting. As represented in the equation, "X" represents the document set "A," as defined above, and "Y" represents the document set "C," as defined above. In other words, in the Jaccard coefficient measurement, the formula for a given skill "S" is the intersection of the set of documents that match the input query and the set of documents that are tagged with the skill "S" divided by the union of the set of documents that match the input query and the set of documents that are tagged with the skill "S."

Where X=set of documents that match the input query; and

Where Y=set of documents in the entire document collection, regardless of the given search, tagged with a given skill concept, then the Jaccard calculation is:

$J(X,Y)=$((set of documents that match the input query)∩(set of documents that are tagged with the skill "S"))/((set of documents that match the input query)∪(set of documents that are tagged with the skill "S".))

From the TF-IFD or Jaccard calculation, the most relevant or "topical" skills and job titles are identified based on the calculated scores. The skills and job titles with the highest relevance (or frequency) are ranked as top skills and top job titles (i.e., the required skills and required titles). The top N skills and job titles are used to match against skills and job titles that have been tagged to courses.

Selection of the top N skills and job titles (i.e., the required skills and required titles) can be computed by one of several methods. One method is to simply take the top N skills as sorted by their TF-IDF or Jaccard score. Another method is to select a varying number of skills by using a threshold of the TF-IDF or Jaccard score. Alternatively, another method is to perform a "beam search", where the threshold is a set relative to the maximum score. For example, if the beam search factor is 0.75 and the top TF-IDF score is 0.40, then the threshold would be set to 0.30, and all skills or job titles that score above 0.30 would be selected to perform the course search.

The top or required skills and top or required job titles are then given a weighted matching score. In some embodiments, the top/required skills and titles are mapped to weight ranges instead of an individual weighted score. In other embodiments, the weights are scaled relative to their TF-IDF or Jaccard score. In some embodiments, the weights are scaled relative to their TF-IDF or Jaccard score and then mapped into weight ranges.

In one example, a set of matching criteria can be created from the top 5 weighted skills and top 3 weighted job titles, and these top skills and top job title criteria can be combined to create a set of 8 top weighted criteria. An educational course is selected for matching to the criteria, and the course itself has been tagged with criteria (skills and job titles). The course is evaluated against each of the 8 criteria. If the course has the same job title as listed in the criteria, a matching score of 1 can be given (perfect match). If the job titles do not match, a score of 0 is given (uncorrelated match). Intermediate scores for matching can be also assigned between 0 and 1 to measure a degree of matching. An average weight is then determined based on the matching scores of each of the criteria.

To illustrate further, the title criteria of the job requisition and the educational course can have a matching score of 0.3, 0.5, and 0.7, respectively, which results in an average weight of 0.5 for the title criteria (N=3). The skills criteria may have matching scores of 0.1, 0.3, 0.5, 0.7, 0.9, respectively, which results in an average weight of 0.5 (N=5). The average of the weights of all 8 criteria is computed. In most cases, all of the criteria are required criteria in the calculation.

If a course has an average weighted score that is greater than a pre-defined threshold based on matching of the skills and job title criteria, then the course is determined to be relevant to the set of job postings. The course is selected and presented from the online system to the user via the web application. One or more courses that are relevant to the user's input query (and matched to the top skills and top job titles of the job posting results) are presented to the user.

In the case where a single job requisition is retrieved as matching the user's input query rather than multiple job requisitions, all of the skills in mentioned in that specific job requisition can be used as required skills and can have the same weight, or the skills mentioned in the job requisition can be each weighted based on the log inverse frequency of the skill in all job requisitions in the knowledge base (document set "D"). Optionally, the number of skills that are considered can be limited.

Figure 11:
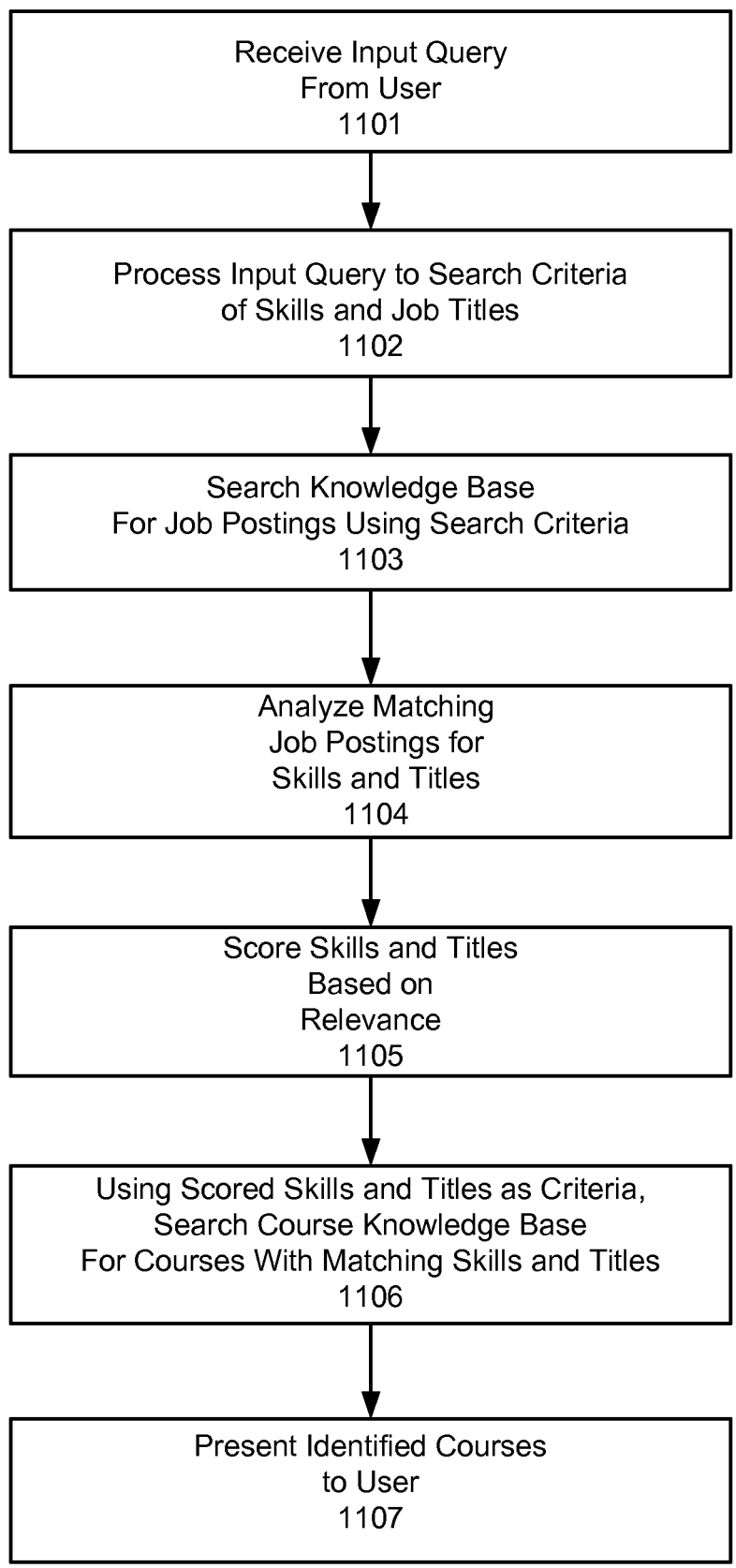
FIG. 11 is an example flow diagram of a process for matching educational courses to skills and titles from job requisitions retrieved based on a user's input query, according to one embodiment of the invention.

FIG. 11 illustrates an example process for identifying courses to present to a user. The system receives 1101 an input query from a user, processes the input query into search criteria, which includes skills and job titles 1102, and searches 1103 the knowledge base for job postings that match the search criteria. The system analyzes 1104 the matching job postings for skills and job titles and scores 1105 the skills and job titles based on relevance. The knowledge base is searched 1106 for courses with matching skills and job titles and the identified courses are presented 1107 to the user.

E. Resume Gap Analysis and Course Recommendations

The user's resume can also be compared with a list of job requisitions identified from any of the methods described above. By comparing the requirements of job requisitions with the concepts of a user's resume, the system provides a gap analysis of what skills, titles, experiences, trainings, etc. that a user lacks for the job requisitions. It is understood that the methods described in the sections that follow can be performed to identify resume gaps, suggest courses, rank resumes, etc. with regard to skills, titles, or both, or other aspects of the resume, and the terms "skills and/or titles" or "skills/titles" are intended to signify this.

Figure 12:
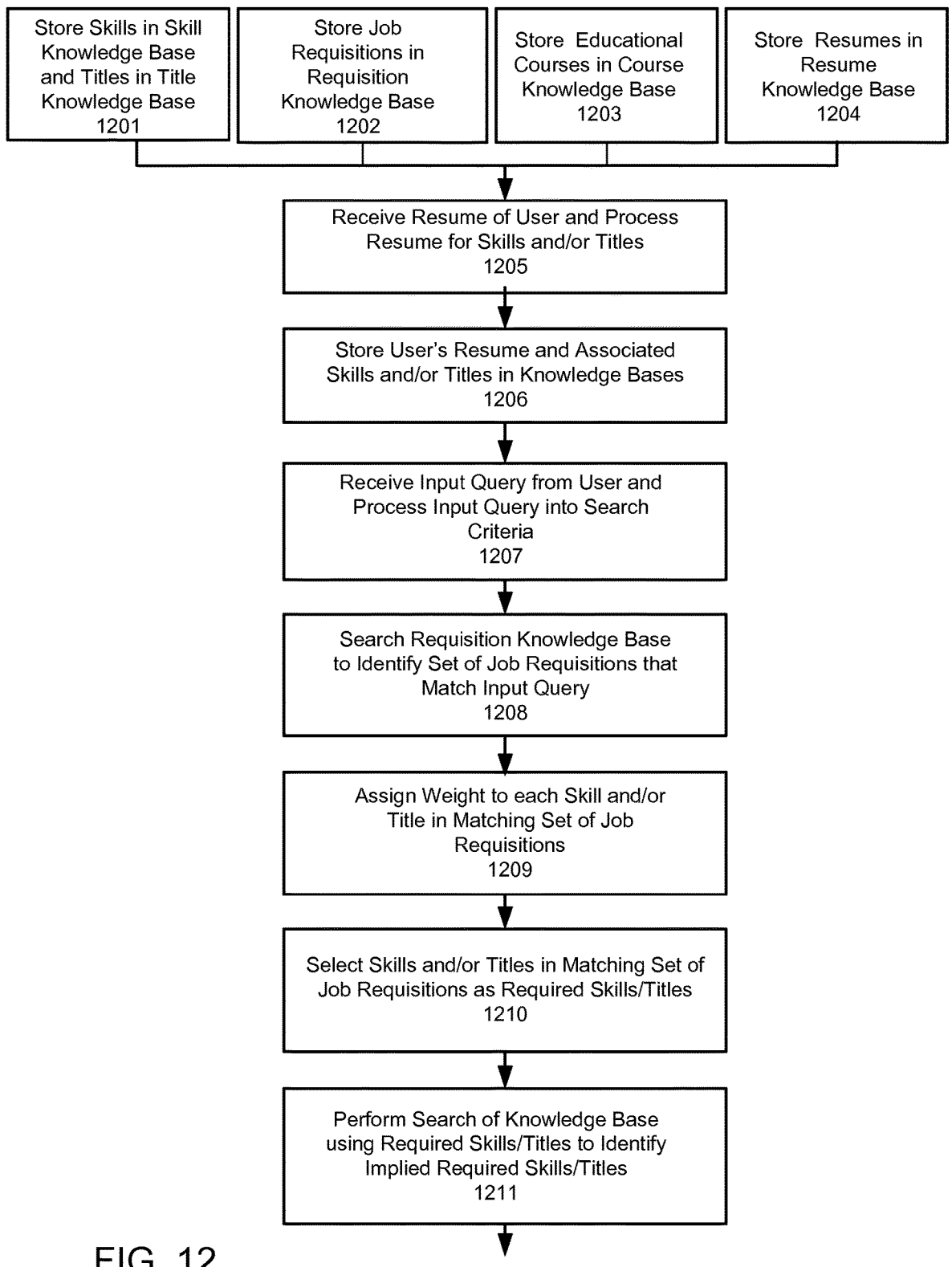
FIG. 12 is an example flow diagram of a process for identifying gap skills or gap titles for a resume and identifying educational courses that match those gap skills or titles, according to one embodiment of the invention.

As shown in FIG. 12, the system stores 1201 skills/titles in a skill/title knowledge base (SkillKB, TitleKB), stores 1202 job requisitions in a requisition knowledge base (RequisitionKB), stores 1203 educational courses in a course knowledge base (EducationKB or CourseKB), and stores 1204 resumes in a resume knowledge base (CandidateKB or ResumeKB). These are stored in the manner described above, and the requisitions, resumes, and courses are associated with the skills and titles in the knowledge bases. The system also receives 1205 the resume of the user and processes the resume for skills and titles (e.g., referred to as "resume skills" and "resume titles") in the manner described above. The system stores 1206 the resume and associated skills and titles in the knowledge bases.

The system receives 1207 an input query from a user. For example, this may be a query for a particular type of job of interest with keywords, such as "Mountain View" and "software engineer." The system processes the input query into search criteria for searching the knowledge base as described above, and searches 1208 the requisition knowledge base for job requisitions that match the search criteria from the input query. The system assigns 1209 weights to each skill and/or title in the matching set of job requisitions, and selects 1210 skills and/or titles as required skills and/or titles. For example, the required skills and/or titles can be identified by multiplying the number of job requisitions in the matching set that require a given skill by the log inverse frequency of the skill in all jobs (e.g., a TF-IFD) or by performing a Jaccard calculation, as explained in detail above. The skills and/or job titles with the highest relevance (or frequency) are selected as required skills and/or titles by, for example, sorting by weights. For example, the top skills and/or titles can be selected 1210 based on having weights over some threshold value, or a specified number of skills and/or titles having the highest weights in the sorted list can be selected 1210 (e.g., top ten highest ranked titles).

In some cases, the matching set of job requisitions contains only a single job requisition. In this case, the system can use all of the skills and/or titles mentioned in that single job requisition and can assign the same weight to each of the required skills. Alternatively, the system weights each of the skills in the single job requisition based on a log inverse frequency of the skill in the collection of job requisitions of the requisition knowledge base. The system can also optionally limit the number of skills selected as required skills to some specified number, such as by selecting the skills having the weights over some threshold number or selecting a specified number.

For identifying the gaps in the user's resume (e.g., skills and/or titles missing from the resume), the required skills and titles (and more specifically, the skill criteria and title criteria derived from those) are used to analyze the collection of resumes in the knowledge base to determine a scored and ranked ordered set of skills and/or titles, referred to as "implied required skills" or "implied required titles." The collection of resumes analyzed can include the all or some portion of the resumes in the knowledge base, such as the known top 1000 documents of a type, or documents having some similar attribute, such as geography or grade point average. The implied required skills/titles include skills/titles that are presumed to be "required" for the jobs in collection of job requisitions. The implied required skills/titles include skills/titles associated with/related to or subsumed by the required skills/titles plus the required skills/titles themselves. For each of the required skills/titles, the implied required skills/titles are determined by searching 1211 the one or more knowledge bases to find all of the skills/titles subsumed in the knowledge base hierarchy by each required skill/title. For example, referring to FIG. 9, Object-Oriented Programming Language is shown as one of the skills in the hierarchy. The children of Object-Oriented Programming Language are the skills Java, C++, and C#. These three skills are skills that are subsumed by the Object-Oriented Programming Language skill. Thus, assuming Object-Oriented Programming Language is a required skill for a job search conducted by the user, the skills Java, C++, C, and Object-Oriented Programming make up a set of implied required skills for that job search.

Figure 13:
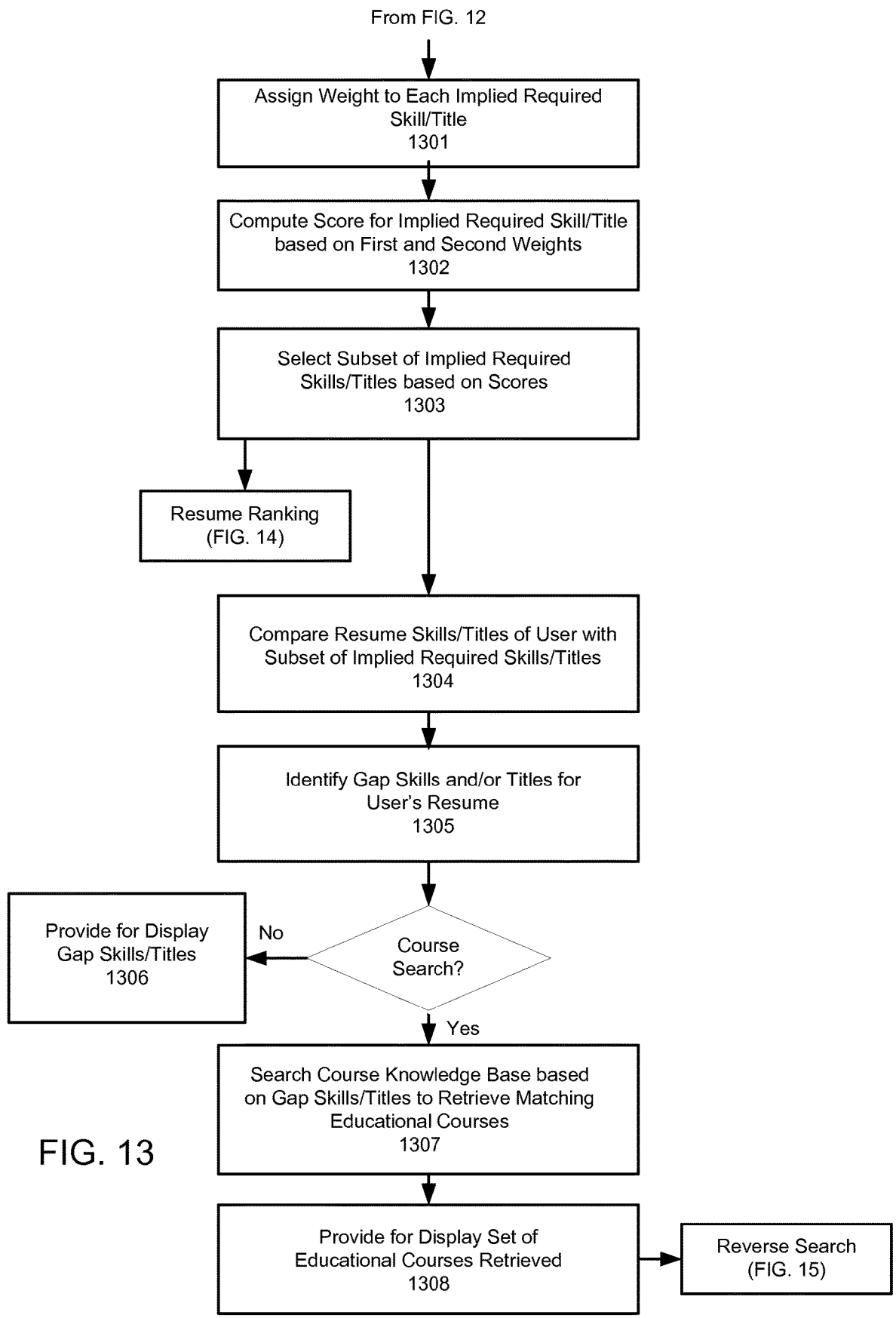
FIG. 13 is a continuation of the example flow diagram of FIG. 12, according to one embodiment of the invention.

The process of FIG. 12 continues to FIG. 13 and the implied required skills/titles are assigned 1301 weights based on a frequency of occurrence of the implied required skills in the collection of resumes in the resume knowledge base (e.g., all or some portion of the resumes). For example, the implied required skills/titles can be weighted by the log frequency in which the skill/title is used in the resumes in the knowledge base. Unlike the frequency calculation described above, which was an inverse frequency, this frequency is a direct frequency. A score is then computed 1302 for each of the implied required skills/titles based on the weights of the required skills/titles and the weights of the implied required skills/titles. For example, using the weights of the required skills/titles determined as described above, a weighted average for each of the implied required skills/titles weights can be computed. A subset of the implied required skills/titles can be selected 1303 by, for example, sorting the implied required skills/titles based on the weighted average of their weights and selecting 1303 those with weights above a threshold, selecting a specified number with the highest weights, among other methods. For example, if analysis of the set of jobs that match a users query of "database software engineer" resulted in three key skills (e.g., Databases, Object Oriented Programming, and Java), an analysis of each of these skills in the resume Knowledge Base can result in the following subsets of skills: for Object Oriented Programming: Java, C++, and C#; for Java: Java, JDBC and JMX; and for Databases: MySQL, JDBC and Oracle 12c. Next, a combined analysis of these skills can result in the following ranked ordered list: Java, JDBC, C#, MySQL, Oracle 12c and JMX.

As shown in FIG. 13, following the selection 1303 of implied required skills/titles, there are two procedures that can be performed (in any order), the resume gap analysis (steps 1304-1308) or a resume ranking (shown in FIG. 14, described below). In the resume gap analysis, the resume skills/titles of the user are then compared 1304 with the set of implied required skills/titles to identify 1305 what skills/titles are missing from the user's resume. In other words, the implied required skills/titles ("I") can be intersected with the resume skills/titles ("R") to compute 1305 the gap skills/titles ("G"). The gap skills/titles are the implied required skills/titles that are absent from the resume skills/titles of the user. Indeed, the intersection or comparison of skills/titles reveals three types of skills/titles for the user: 1) complementary skills/titles, 2) gap skills/titles, and 3) unnecessary skills/titles. The overlapping ("O") set of skills/titles is the intersection between the resume skills R and the job requisition skills I are considered to be complementary skills/titles; (O)=(I∩R). The gap skills/titles are computed by taking the job requirement skills/titles and eliminating the resume skills/titles (i.e. job requirement skills/titles but not including resume skills/titles); G=(I−R). Unnecessary ("Y") skills/titles are those that are found in the resume, but not relevant or needed for the job requisition; Y=(R−I). These comparisons can also be performed for other qualifications, such as educational experience, training, certifications, etc. In some embodiments, the gap skills and/or titles are reported to or provided 1306 for display to the user, and the process of FIG. 13 can end here.

Where a course search is to be performed, the process of FIG. 13 can continue to the next step in which ways to fill the gaps are suggested to the user. For each gap skill/title, the system searches 1307 the course knowledge base (CourseKB) to identify courses that match the missing skill and/or title (e.g., teach the user the required skill for the job requisition or provide the user with knowledge or opportunities that allow the user to acquire the missing title) that are provided 1308 for display to the user. For instance, if a user has not received "C++ programming" training or has not had similar education or work experience, the CourseKB is searched for courses that cover basics in C++ programming language. This process of comparing the user's resume with the job requisition can be repeated for each of the skills, qualifications, prerequisites or requirements (education, experience, etc.) for a job requisition or multiple job requisitions. In some embodiments, this search can also produce other types of search results to help the user fill the gaps in his resume. For example, the search could provide books, DVDs, CDs, applications/software, or other content relating to the topic of the skill or title the user is missing. The search could also provide a list of teachers or coaches on the topic, jobs that could provide the skill or title missing, and other ways to attain the missing skills or titles. In some embodiments, advertisements relating to the skills and titles missing might also be provided to the user, such as ads for books required by one of the educational courses provided in the search results.

Figure 15:
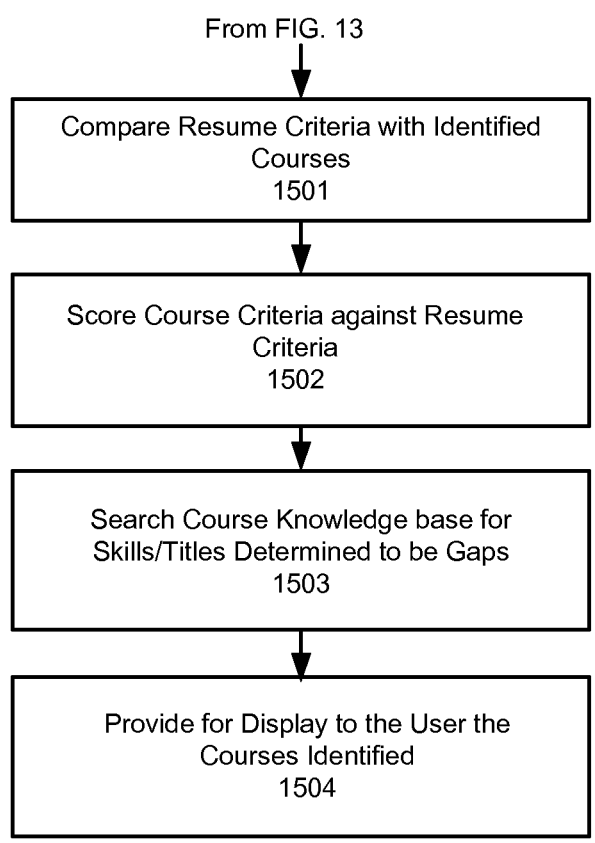
FIG. 15 is an example flow diagram of a process for conducting a reverse search based on educational courses identified for resume gaps, according to one embodiment of the invention.

In another embodiment, the course recommendation analysis follows the above described process of identifying educational courses based on the user's input query or resume. Once the matching educational courses have been identified, the system uses the resume from a user in a reverse search, evaluating each of the identified courses against the resume, as shown in FIG. 15.

An educational gap analysis is performed by comparing 1501 criteria extracted from the user's resume (e.g., skills, titles, experience, education) with the concepts in each of the identified courses. The educational courses have each been tagged with relevant criteria or concepts, such as skills, titles prerequisites, topics covered in the course, certification or training to be received in the course, etc. Each of the criteria in the courses is scored 1502 against the user's resume, using one or more of the scoring methods described above.

If the resume does not include a given skill/title, there is no match, and a score is given to indicate that there is a gap in the user's resume for the required skill/title (e.g., a score of 1). If the user's resume does include the given skill/title, then there is a match of skills/titles between the resume and the job requisition, and the user does not require additional education for attaining the skill/title. A match may be given a score of 0, which indicates that there is no gap between the resume and the job requisition for that particular skill/title. Intermediate scores for matching can be also assigned to measure a degree of matching (for example, assigning a score between 0 and 1, if a user has limited experience with the skill/title).

For each uncorrelated match of criteria, the system determines that the user lacks the required skill, title, training, certification, or experience for the job. The unmatched criteria are used to search 1503 against the CourseKB to identify courses that would help the user meet the job requirement. The courses that help the user fill the gap between their current skills/titles, qualifications and education and the requirements of the job requisition are identified and presented 1504 to the user, as either an advertisement, notification, or via a web application.

F. Resume Ranking

Figure 14:
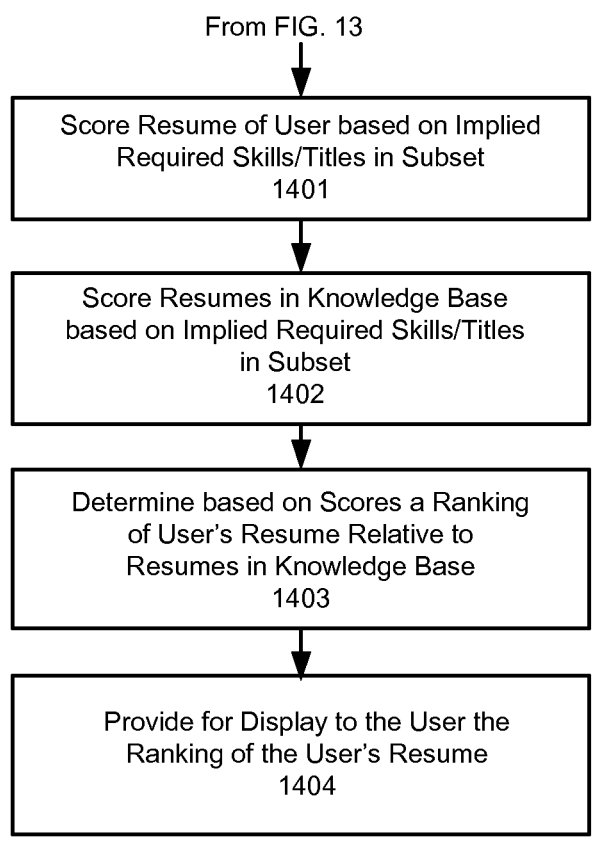
FIG. 14 is an example flow diagram of a process for ranking a resume of a user and other resumes in a knowledge base, according to one embodiment of the invention.

Another application of the identification of implied skills/titles is the ranking of the user's resume relative to other resumes As described in FIG. 14, the system scores 1401 the resume of the user based on the implied required skills and/or titles of the subset selected 1303 in FIG. 13, using the scoring methods described above. The system further scores 1402 the collection of resumes in the resume knowledge base (CandidateKB) or some portion of the collection based on each of the implied required skills and/or titles in the subset. In some embodiments, only a portion of the collection of resumes matches the input query and is used for scoring, and the remaining resumes are not scored, or given a score of zero. The user's resume is then ranked 1403 based on these scores relative to resumes in the knowledge base with regard to each of the implied required skills and/or titles. In this manner, the user's resume is evaluated relative to other resumes in the knowledge base. In one embodiment, the user's resume is given a percentile rating relative to the number of other resumes for each of the individual implied skills. For example, the user's resume may be ranked 723 out of 10,000 resumes, and thus be in the top 8%. But, if the user's resume is ranked 723 out of 1000, then it is in the bottom 20%. In addition, the system can also let the user know for that type of job search that the user is doing, as an aggregate, where the user's resume ranks relative to all resumes (an absolute ranking), taking all of the criteria under consideration for the user's particular input query.

The system then provides 1404 the determined ranking of the user's resume for display to the user. Thus, the user is provided with information about how his resume holds up to all of the other resumes in the database, and can assess his strength relative to other job candidates.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for identifying gaps in a resume, the method comprising:

storing in a computer system a skill knowledge base comprising a collection of skills;

storing in the computer system a requisition knowledge base comprising a collection of job requisitions, each job requisition associated with one or more skills in the skill knowledge base;

storing in the computer system a resume knowledge base comprising a collection of resumes, each resume associated with one or more skills in the skill knowledge base;

storing in the resume knowledge base a resume of a user received into the computer system, the resume associated with a first set of skills in the skill knowledge base that match resume skills in the resume;

receiving an input query from the user;

conducting a search of the requisition knowledge base for job requisitions using the input query as input to the search;

identifying, by the search of the requisition knowledge base, a set of job requisitions matching the input query;

identifying, from each of the job requisitions of the matching set, a second set of skills listed in the job requisition that are desired in users applying for a job;

assigning a distinct weight to each skill of the second set based on a frequency of occurrence of each skill across the collection of job requisitions in the requisition knowledge base;

selecting, based on the assigned weights, skills of the second set from each of the job requisitions in the matching set to be designated as required skills for the input query;

conducting a search of the resume knowledge base using the required skills as input to the search;

identifying, from results of the search, a third set of skills of other users listed in resumes that are subsumed by the required skills, the third set of skills based on the required skills and being designated as implied required skills for the input query;

assigning a distinct weight to each of the implied required skills based on a frequency of occurrence of the implied required skills in the collection of resumes in the resume knowledge base;

computing a score, by a processor of the computer system, for each of the implied required skills based on the weights assigned to the implied required skills and the weights assigned to the required skills;

selecting, based on the scores, a subset of the implied required skills;

comparing the resume skills of the user with the subset of implied required skills; identifying, based on the comparison, gap skills of the user that are skills present in the subset of implied required skills and absent from the resume skills of the user; and providing for display to the user the gap skills, which indicate what skills the user is missing and may need to acquire to be hired for a job matching the user's input query.

2. The method of claim 1, further comprising:

storing in the computer system a course knowledge base comprising a collection of educational courses, each educational course associated with one or more skills in the skill knowledge base;

searching the course knowledge base based on the gap skills to retrieve a set of educational courses matching the gap skills; and providing for display to the user the set of educational courses retrieved.

3. The method of claim 2, further comprising conducting a reverse search of the course knowledge base using the resume of the user to evaluate each of the educational courses retrieved against the resume.

4. The method of claim 1, wherein the assigning of the distinct weight to each of the skill of the second set comprises multiplying a number of job requisitions in the matching set of job requisitions having a given skill by a log inverse frequency of the given skill in the collection of job requisitions in the requisition knowledge base.

5. The method of claim 4, wherein the log inverse frequency is calculated as a Term Frequency Inverse Document Frequency (TFIDF) calculation.

6. The method of claim 1, wherein the selecting, based on the assigned weights, the second set of skills from each of the job requisitions in the matching set to be designated as required skills for the input query comprises sorting the skills of the matching set of job requisitions based on the weights assigned to the other skills, and selecting a specified number of the sorted skills with the highest weights as required skills.

7. The method of claim 1, wherein assigning the distinct weight to each of the second set of skills comprises assigning a Jaccard score to determine which skills are most relevant to the matching set of job requisitions.

8. The method of claim 1, wherein assigning distinct weights to the implied required skills comprises determining a weight for each of the implied required skills based on a log frequency of the implied required skill in the resumes of a fourth knowledge base.

9. The method of claim 1, wherein computing a score for each of the implied required skills based on the weights assigned to the implied required skills weights assigned to the required skills comprises determining a weighted average for each of the weights assigned to the required skills using the weights assigned to the implied required skills.

10. The method of claim 9, wherein the selecting, based on the scores, a subset of the implied required skills comprises sorting the implied required skills based on the weighted averages of the weights assigned to the required skills and selecting a specified number of the sorted implied required skills as the subset of implied required skills.

11. The method of claim 1, wherein the matching set of job requisitions comprises a single job requisition.

12. The method of claim 11, wherein the assigning of the weights to the skills in the matching set of job requisitions comprises assigning a same weight to each of the skills of the single job requisition.

13. The method of claim 11, wherein the assigning of the weights to the skills in the matching set of job requisitions comprises assigning weights by weighting each of the skills in the single job requisition based on a log inverse frequency of the skill in the collection of job requisitions of the requisition knowledge base.

14. The method of claim 1, wherein the conducting of the search of the requisition knowledge base comprises:

generating, from the requisition knowledge database, a reference search result set comprising a reference set of job requisitions and reference scores, generating, from the requisition knowledge database, a reverse search result set comprising a reverse set of job requisitions and reverse scores, and generating, from the reference search result set and the reverse search result set, the set of job requisitions using a secondary combining function and a secondary combining factor.

15. The method of claim 1, wherein the computing of the score, by the processor of the computer system, for each of the implied required skills comprises:

determining an intersection of the set of job requisitions matching the input query and the additional skills identified by the search of the resume knowledge base, and determining the score by dividing the intersection by the union of the set of job requisitions matching the input query and the additional skills identified by the search of the resume knowledge base.

16. A computer-implemented method for identifying gaps in a resume, the method comprising:

storing in a computer system a title knowledge base comprising a collection of titles;

storing in the computer system a requisition knowledge base comprising a collection of job requisitions, each job requisition associated with one or more titles in the title knowledge base;

storing in the computer system a resume knowledge base comprising a collection of resumes, each resume associated with one or more titles in the title knowledge base;

storing in the resume knowledge base a resume of a user received into the computer system, the resume associated with a first set of titles in the title knowledge base that match resume titles in the resume;

receiving an input query from the user;

conducting a search of the requisition knowledge base for job requisitions using the input query as input to the search;

identifying by the search of the requisition knowledge base, a set of job requisitions matching the input query;

identifying, from each of the job requisitions of the matching set, a second set of titles listed in the job requisition that are desired in users applying for a job;

assigning a distinct weight to each title of the second set based on a frequency of occurrence of each title across the collection of job requisitions in the requisition knowledge base;

selecting, based on the assigned weights, titles from each of the job requisitions in the matching set to be designed as required titles for the input query;

conducting a search of the resume knowledge base using the required titles as input to the search;

identifying, from results of the search, a third set of titles of other users listed in resumes that are subsumed by the required titles, the third set of titles based on the required skills and being designated as implied required titles for the input query;

assigning a distinct weight to each of the implied required titles based on a frequency of occurrence of the implied required titles in the collection of resumes in the resume knowledge base;

computing a score, by a processor of the computer system, for each of the implied required titles based on the weights assigned to the implied required skills and the weights assigned to the required skills;

selecting, based on the scores, a subset of the implied required titles;

comparing the resume titles of the user with the subset of implied required titles; identifying, based on the comparison, gap titles of the user that are titles present in the subset of implied required titles and absent from the resume titles of the user; and providing for display to the user the gap titles, which indicate what titles the user is missing and may need to acquire to be hired for a job matching the user's input query.

17. The method of claim 16, further comprising:

storing in the computer system a course knowledge base comprising a collection of educational courses, each educational course associated with one or more titles in the title knowledge base;

searching the course knowledge base based on the gap titles to retrieve a set of educational courses matching the gap titles; and providing for display to the user the set of educational courses retrieved.

18. The method of claim 16, further comprising conducting a reverse search of the course knowledge base using the resume of the user to evaluate each of the educational courses retrieved against the resume.

19. The method of claim 16, wherein the assigning of the distinct weight to each title of the second set comprises multiplying a number of job requisitions in the matching set of job requisitions having a given title by a log inverse frequency of the given title in the collection of job requisitions in the requisition knowledge base.

20. The method of claim 19, wherein the log inverse frequency is calculated as a Term Frequency Inverse Document Frequency (TFIDF) calculation.

21. The method of claim 16, wherein the selecting, based on the assigned weights, a second set of titles from each of the job requisitions in the matching set to be designated as required titles for the input query sorting the titles of the matching set of job requisitions based on the weights assigned to the other titles, and selecting a specified number of the sorted titles with the highest assigned weights as required titles.

22. The method of claim 16, wherein assigning the distinct weight to each title of the second set comprises assigning a Jaccard score to determine which titles are most relevant to the matching set of job requisitions.

23. The method of claim 16, wherein assigning distinct weights to the implied required titles comprises determining a weight for each of the implied required titles based on a log frequency of the implied required title in the resumes of a fourth knowledge base.

24. The method of claim 16, wherein computing a score for each of the implied required titles based on the weights assigned to the implied required titles weights assigned to the required titles comprises determining a weighted average for each of the weights assigned to the required titles using the weights assigned to the implied required titles.

25. The method of claim 24, wherein the selecting, based on the scores, a subset of the implied required titles comprises sorting the implied required titles based on the weighted averages of the weights assigned to the required titles and selecting a specified number of the sorted implied required titles as the subset of implied required titles.

26. The method of claim 16, wherein the matching set of job requisitions comprises a single job requisition.

27. The method of claim 26, wherein the assigning of the weights to the titles in the matching set of job requisitions comprises assigning a same weight to each of the titles of the single job requisition.

28. The method of claim 26, wherein the assigning of the weights to the titles in the matching set of job requisitions comprises assigning first weights by weighting each of the titles in the single job requisition based on a log inverse frequency of the title in the collection of job requisitions of the requisition knowledge base.

* * * * *